June 26, 1956 J. KILBURG 2,752,427
CONTROL MECHANISM FOR AN AUTOMATIC
TELEPHONE DIALER OR THE LIKE
Original Filed Nov. 30, 1948 19 Sheets-Sheet 1

INVENTOR.
JAMES KILBURG
BY
Charles M. Fryer
ATTORNEY

June 26, 1956 J. KILBURG 2,752,427
CONTROL MECHANISM FOR AN AUTOMATIC
TELEPHONE DIALER OR THE LIKE
Original Filed Nov. 30, 1948 19 Sheets-Sheet 2
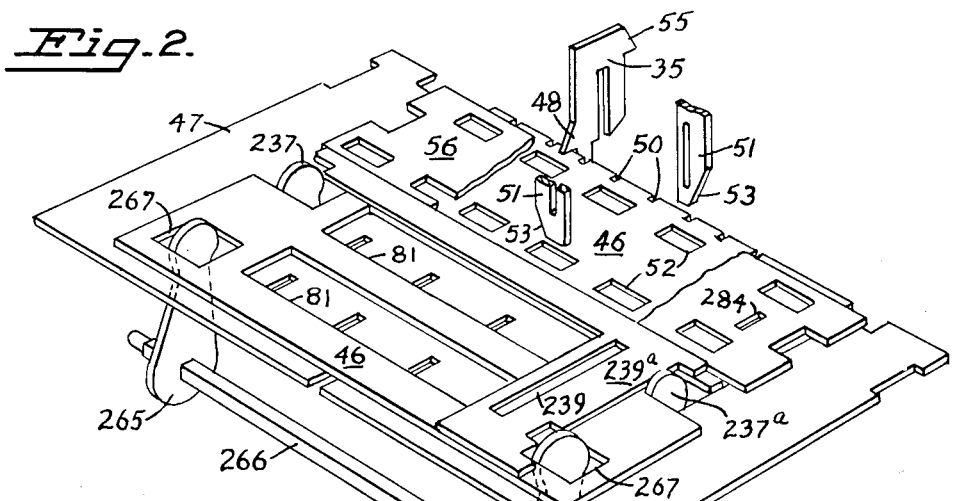
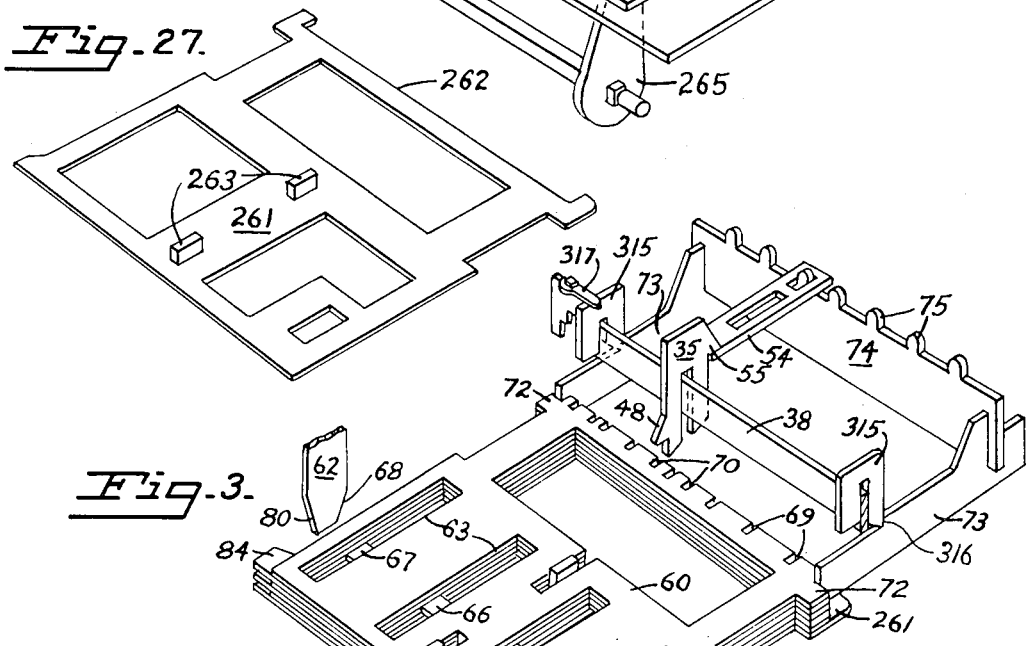
INVENTOR.
JAMES KILBURG
BY
Charles M. Fryer
ATTORNEY

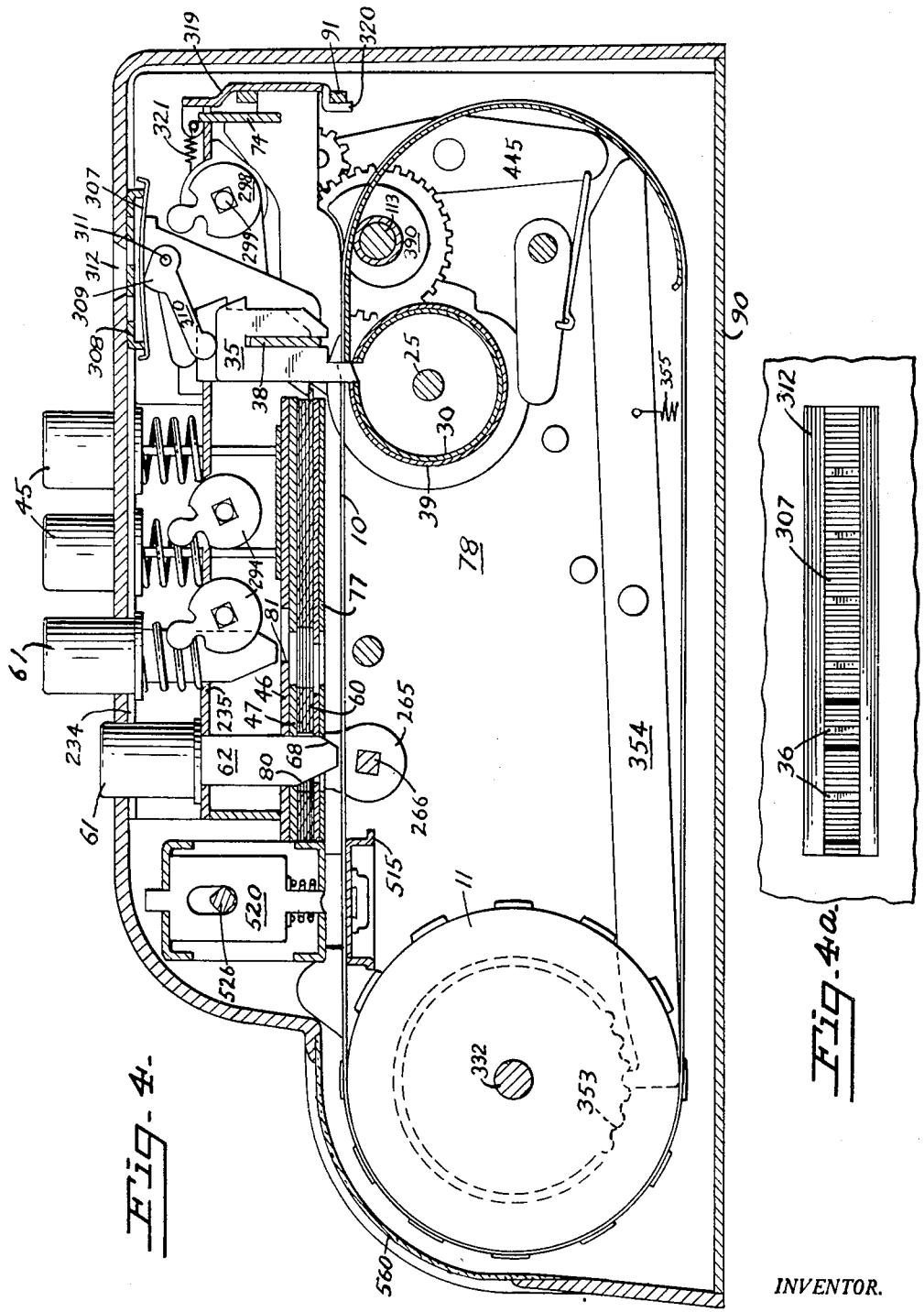

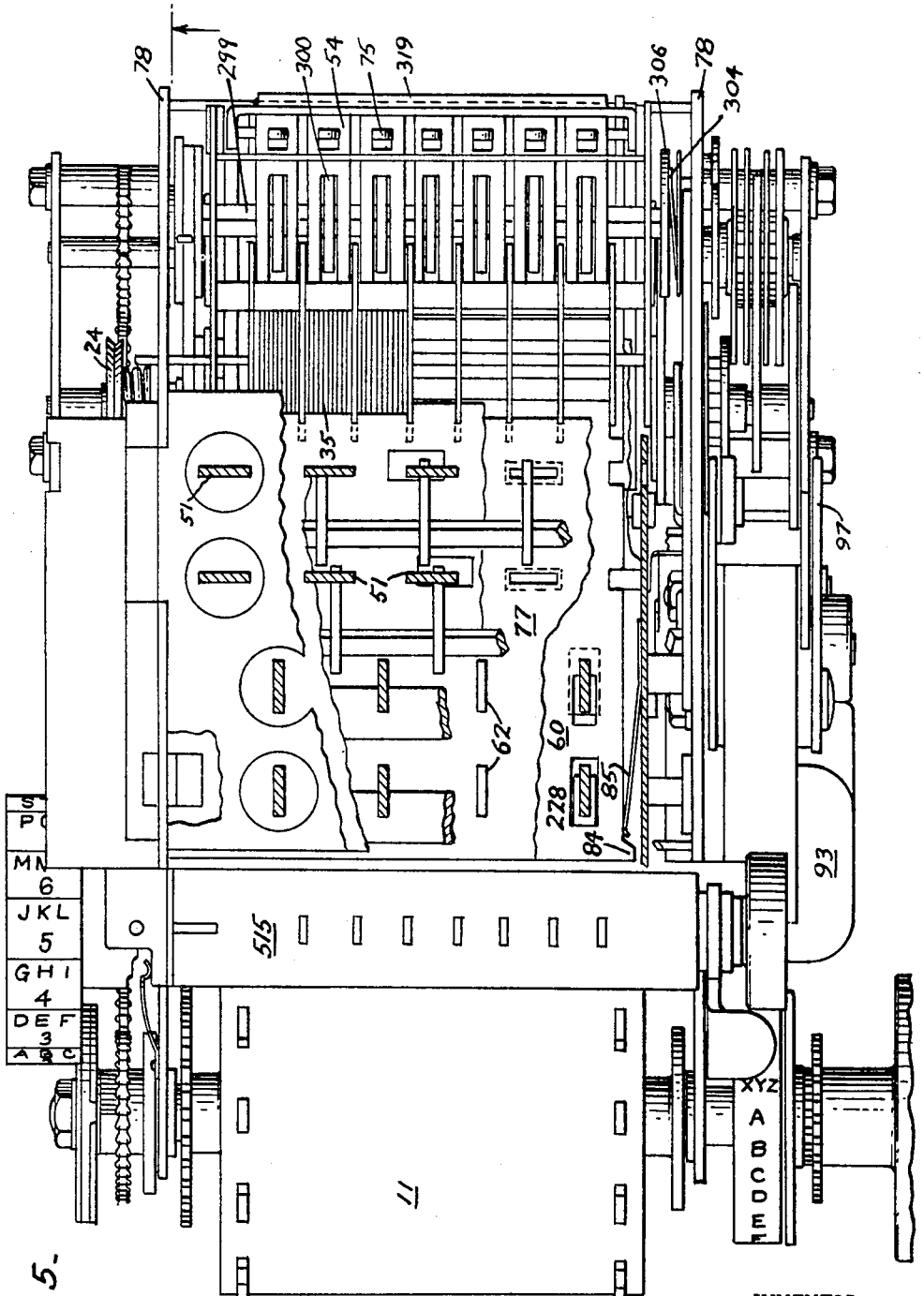

INVENTOR.
JAMES KILBURG
BY
Charles M Fryer
ATTORNEY

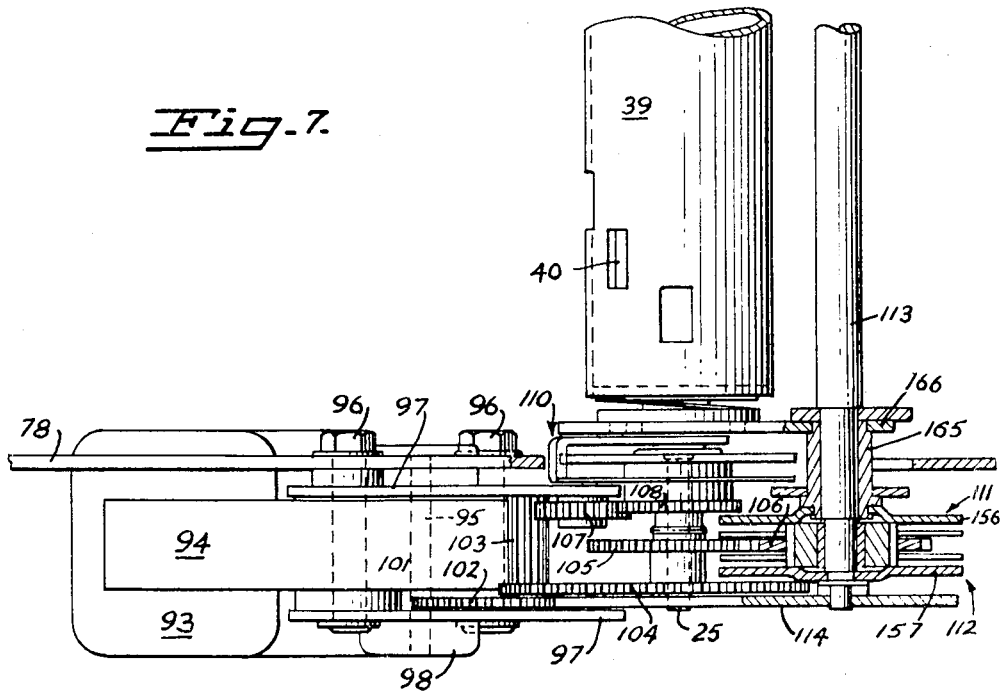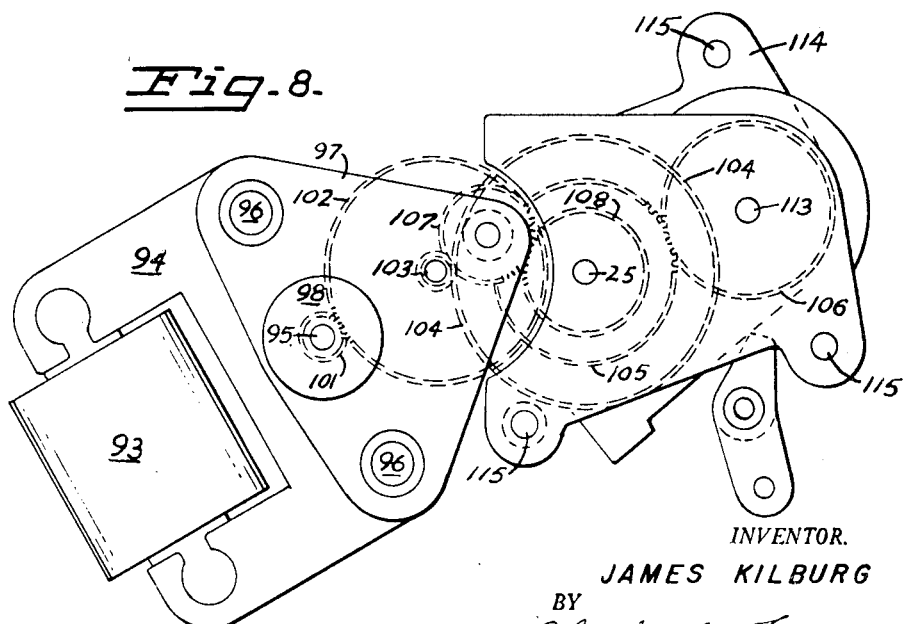

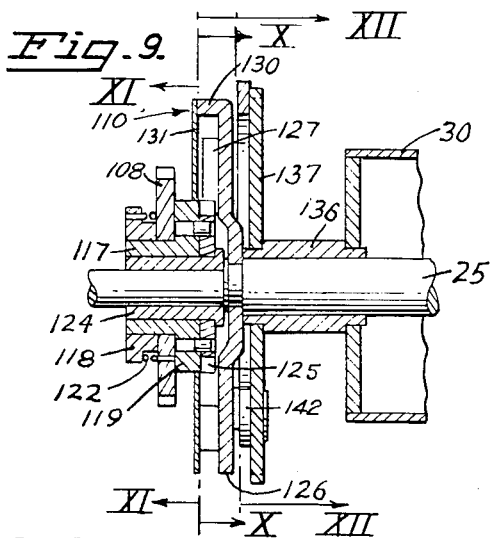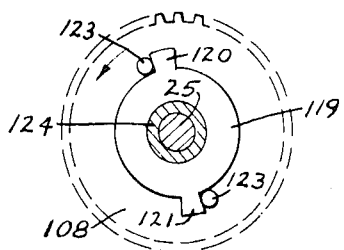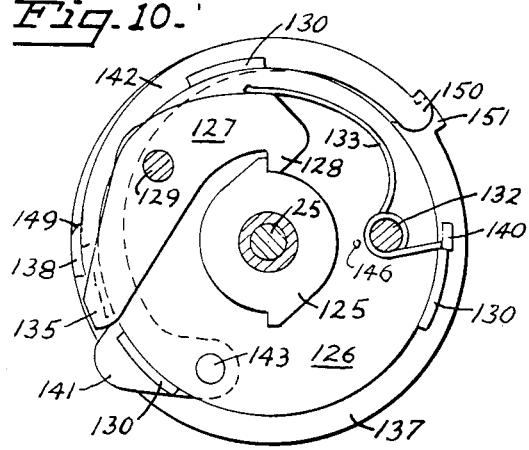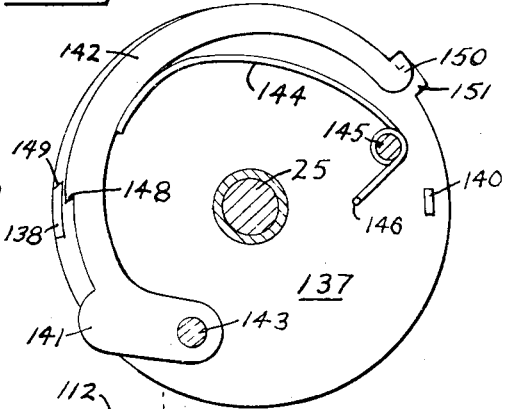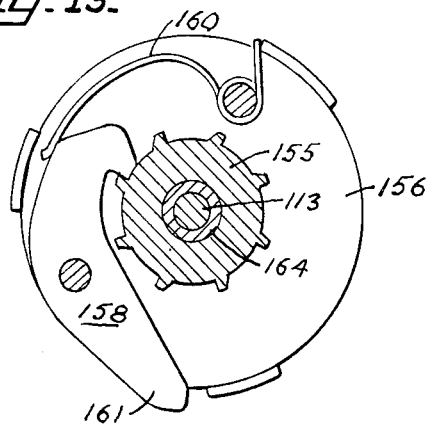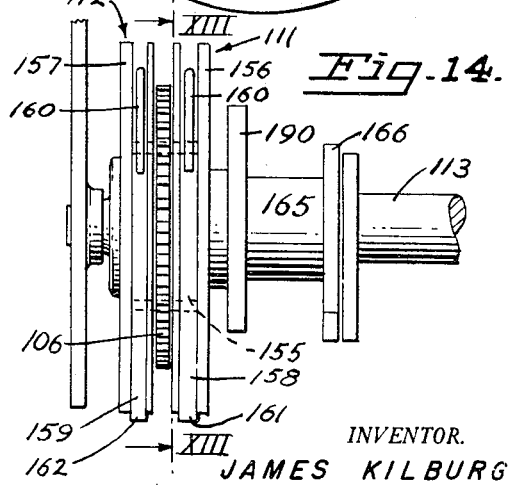

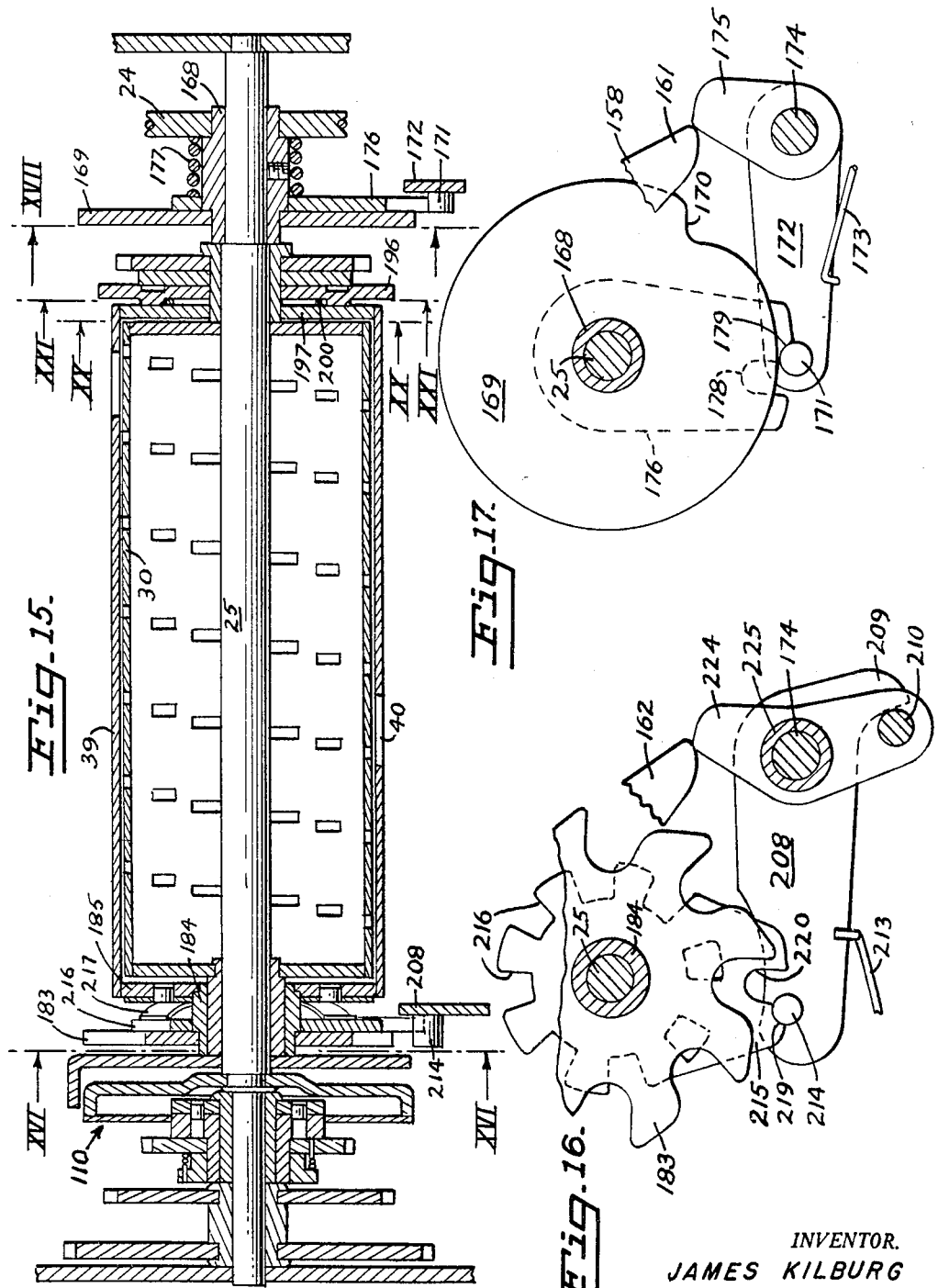

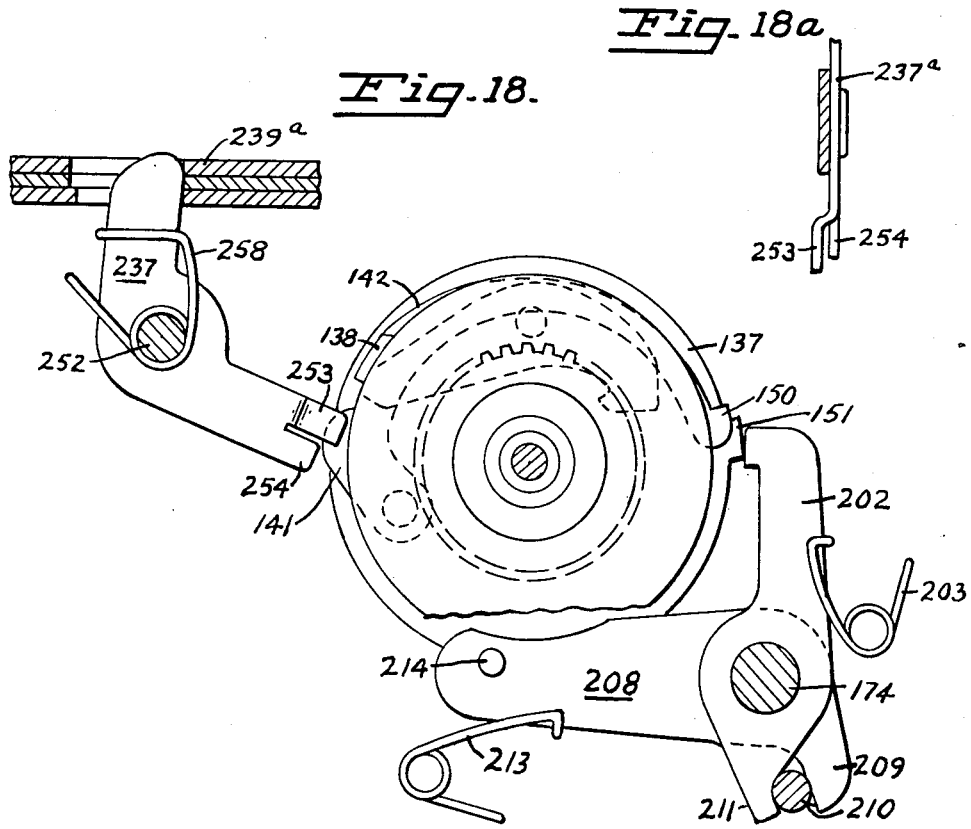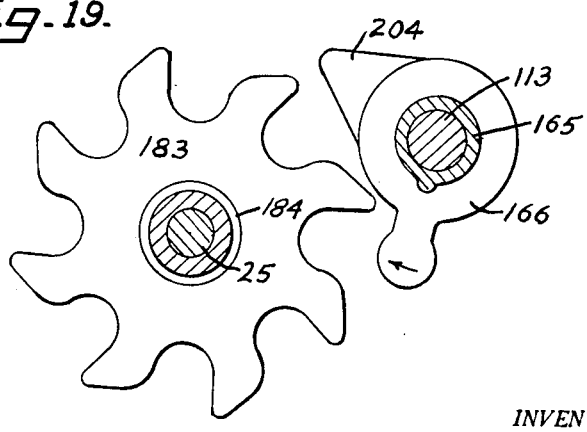

June 26, 1956
J. KILBURG
2,752,427
CONTROL MECHANISM FOR AN AUTOMATIC
TELEPHONE DIALER OR THE LIKE
Original Filed Nov. 30, 1948
19 Sheets-Sheet 10
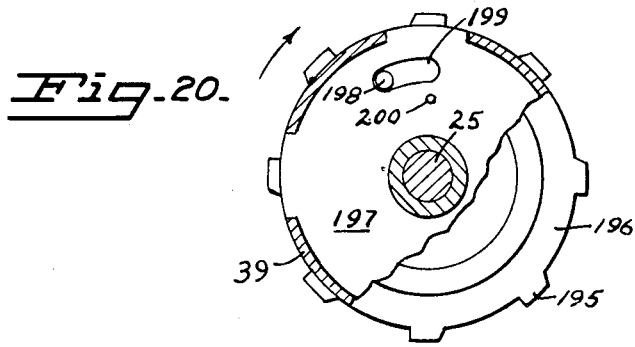
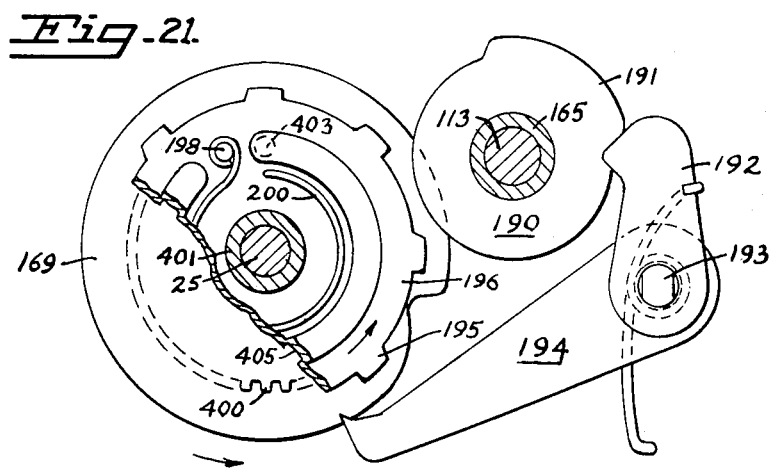
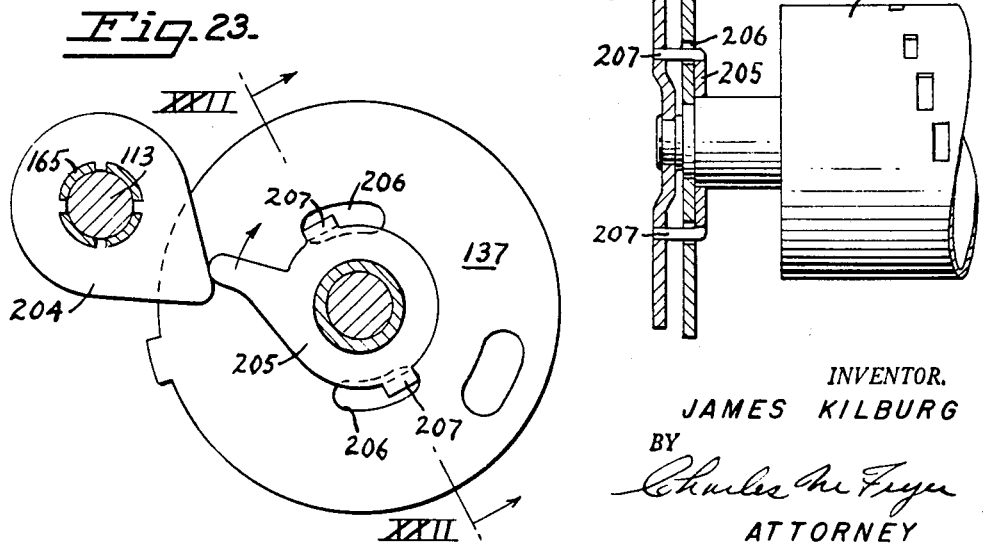
INVENTOR.
JAMES KILBURG
BY
Charles M Freyer
ATTORNEY

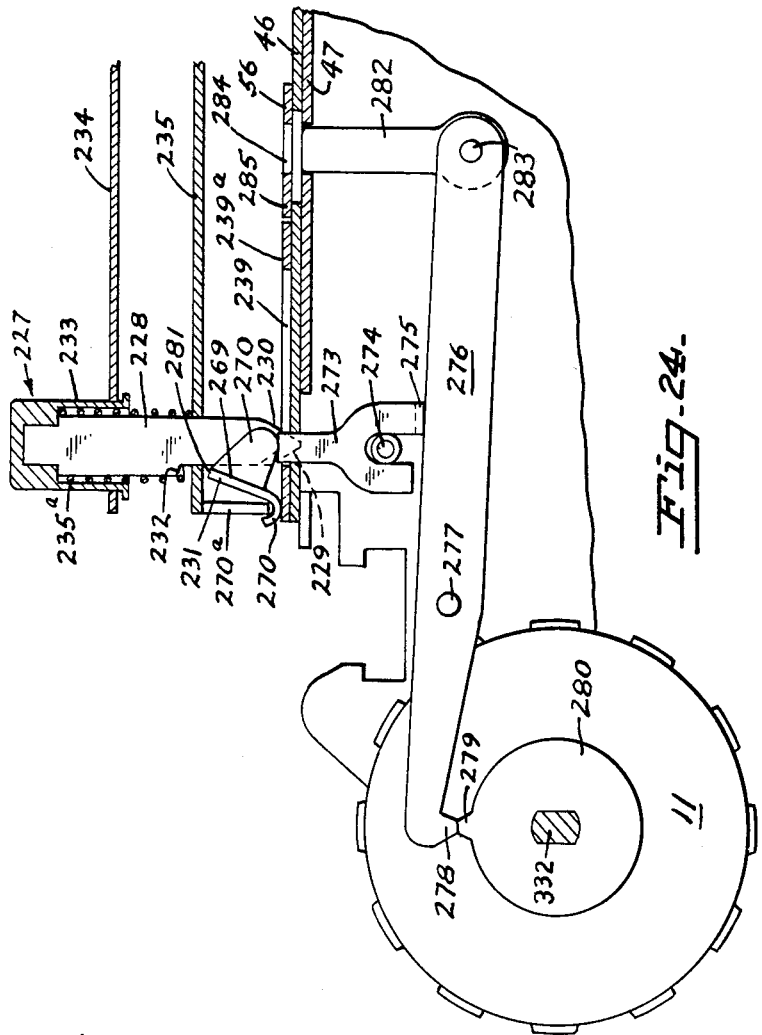
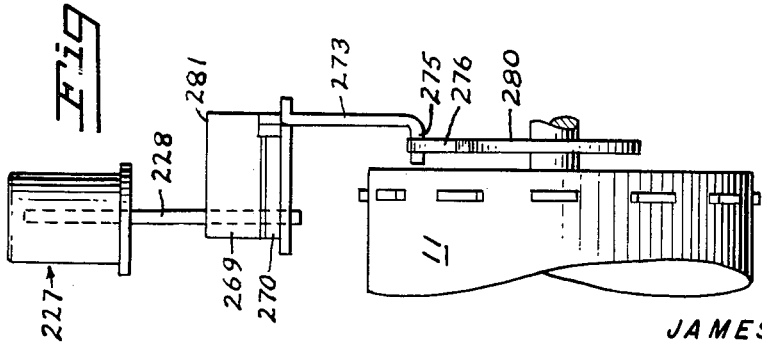
INVENTOR.
JAMES KILBURG
BY
Charles M Fryer
ATTORNEY

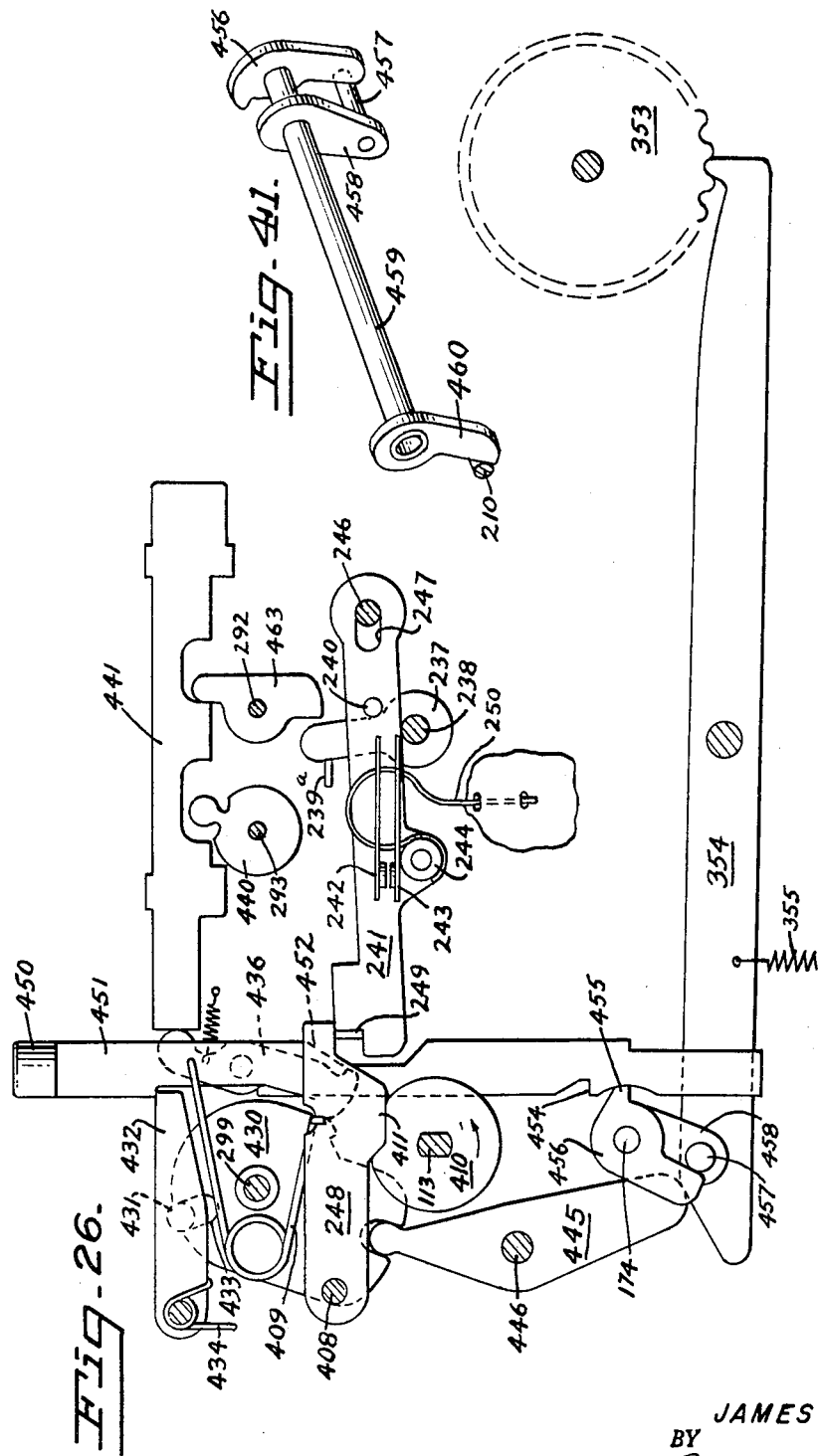

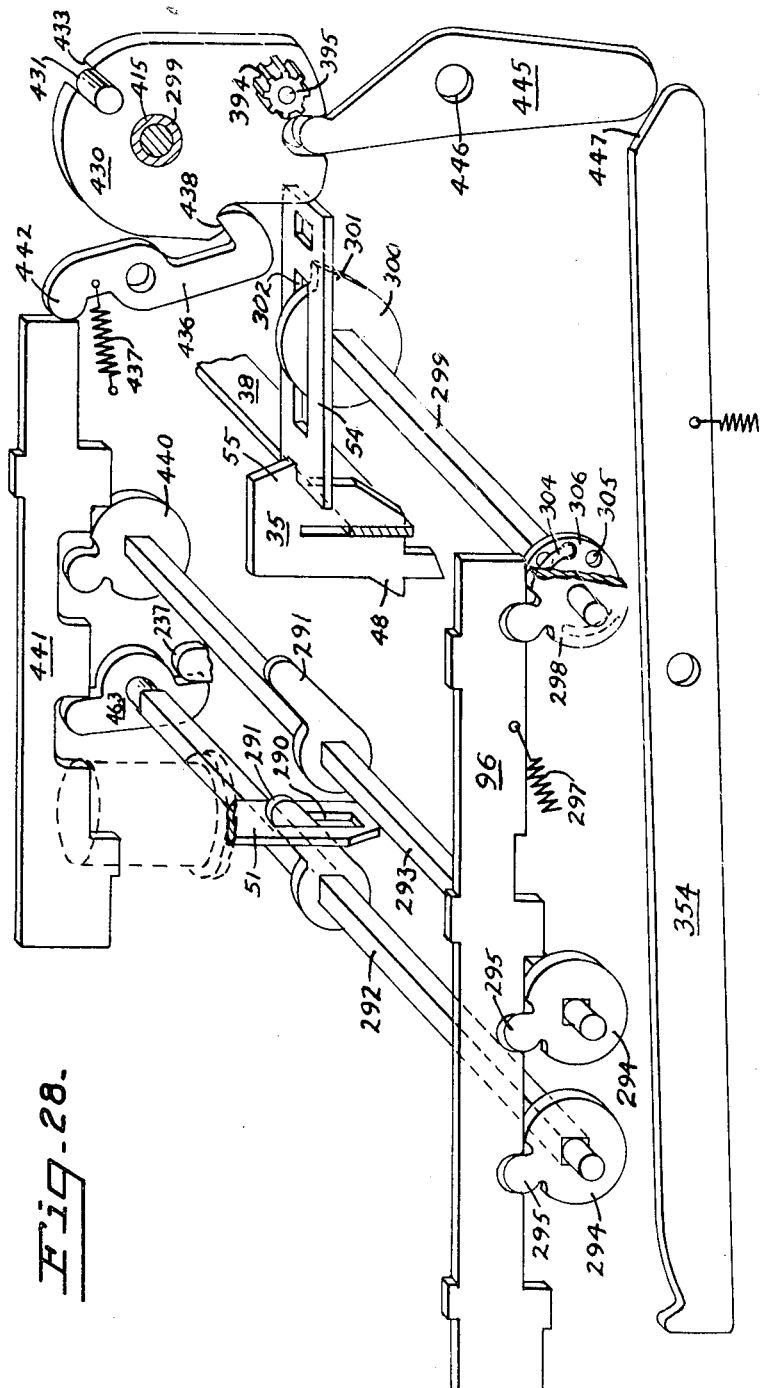

June 26, 1956    J. KILBURG    2,752,427
CONTROL MECHANISM FOR AN AUTOMATIC
TELEPHONE DIALER OR THE LIKE
Original Filed Nov. 30, 1948    19 Sheets-Sheet 14

INVENTOR.
JAMES KILBURG
BY
*Charles M. Fryer*
ATTORNEY

June 26, 1956
J. KILBURG
2,752,427
CONTROL MECHANISM FOR AN AUTOMATIC
TELEPHONE DIALER OR THE LIKE
Original Filed Nov. 30, 1948
19 Sheets-Sheet 15
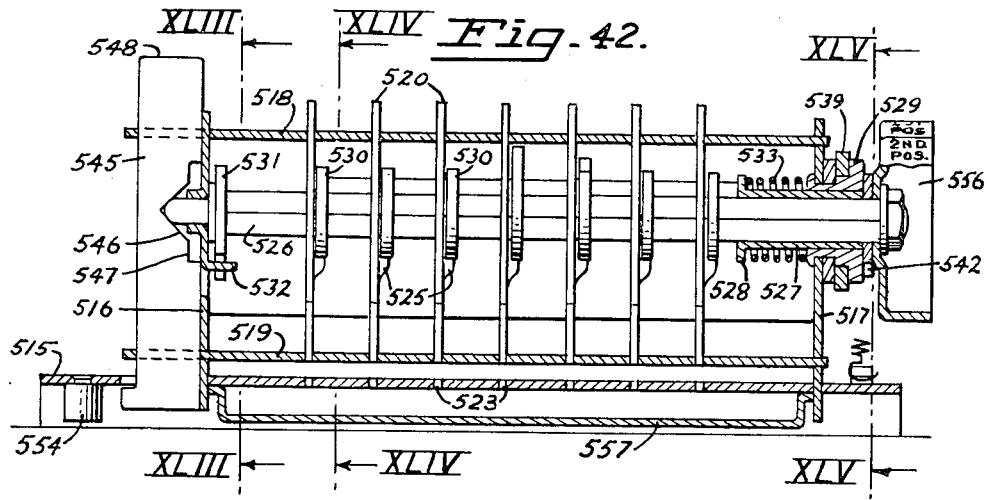
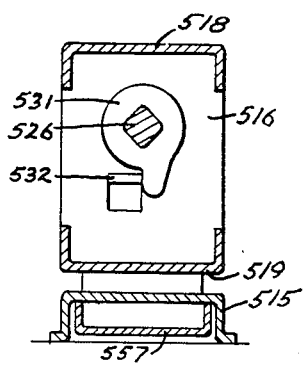
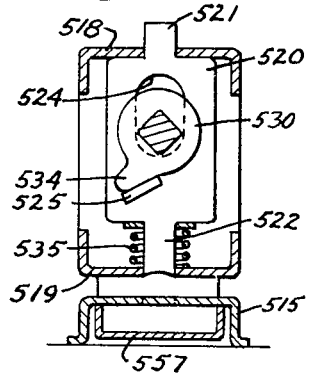
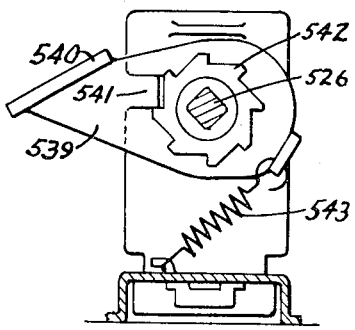
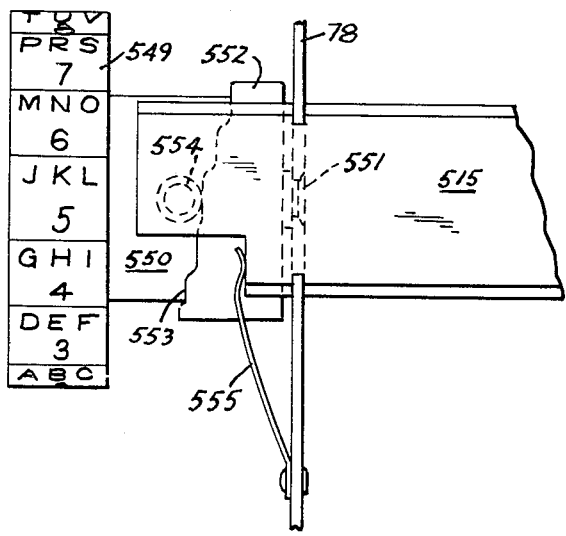
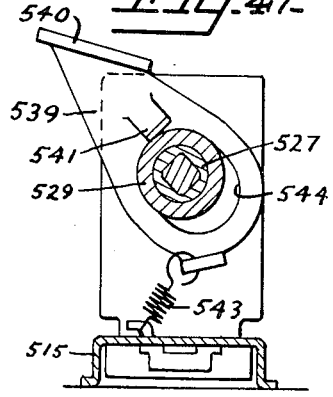
INVENTOR.
JAMES KILBURG
BY
Charles M. Fryer
ATTORNEY

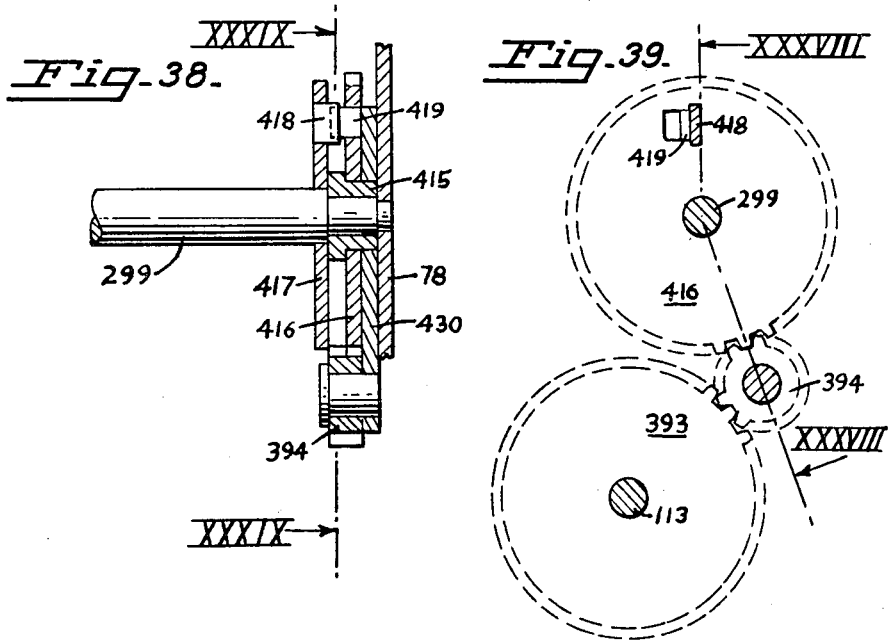
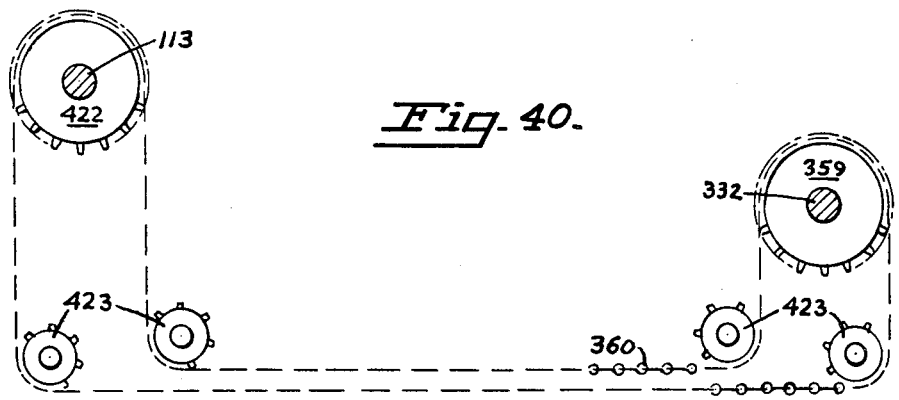

June 26, 1956 J. KILBURG 2,752,427
CONTROL MECHANISM FOR AN AUTOMATIC
TELEPHONE DIALER OR THE LIKE
Original Filed Nov. 30, 1948 19 Sheets-Sheet 17
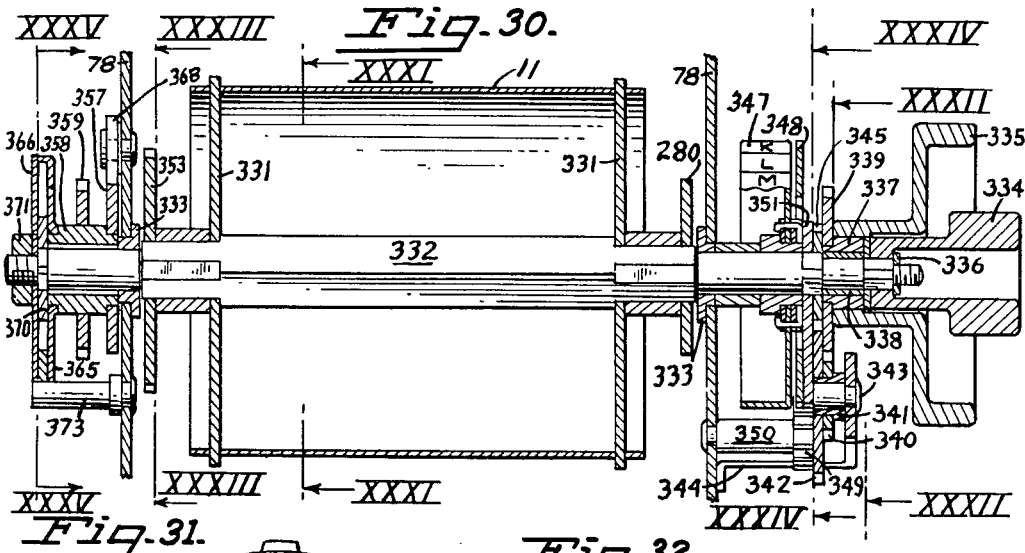
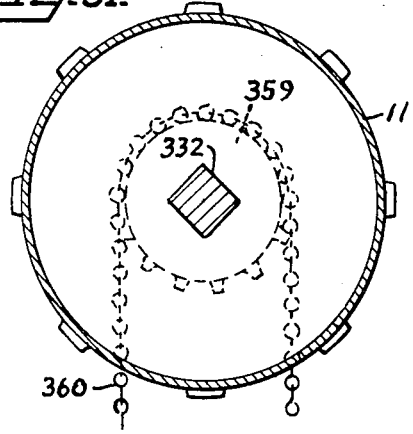
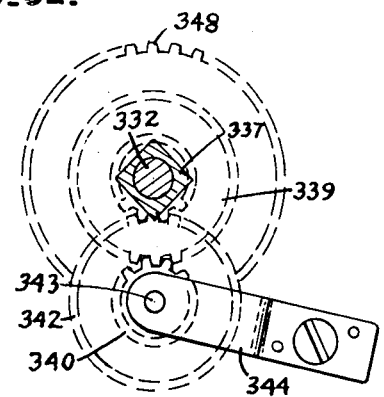
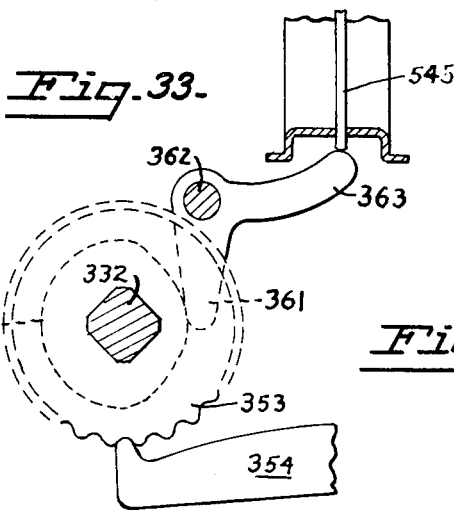
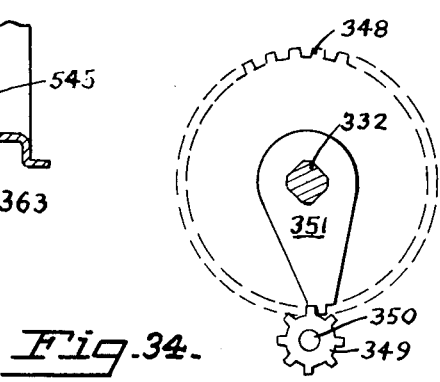
INVENTOR.
JAMES KILBURG
BY
Charles M Fryer
ATTORNEY

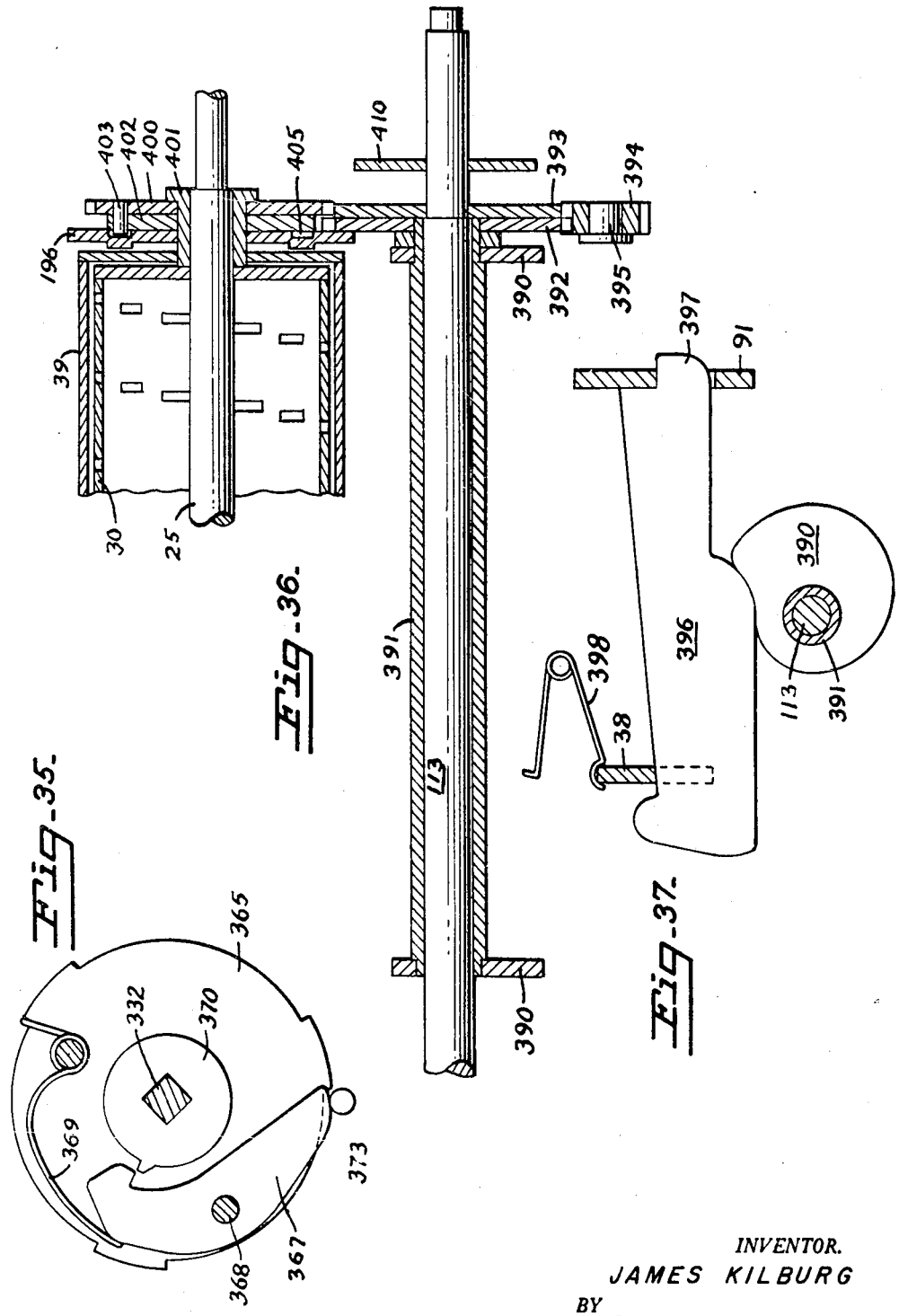

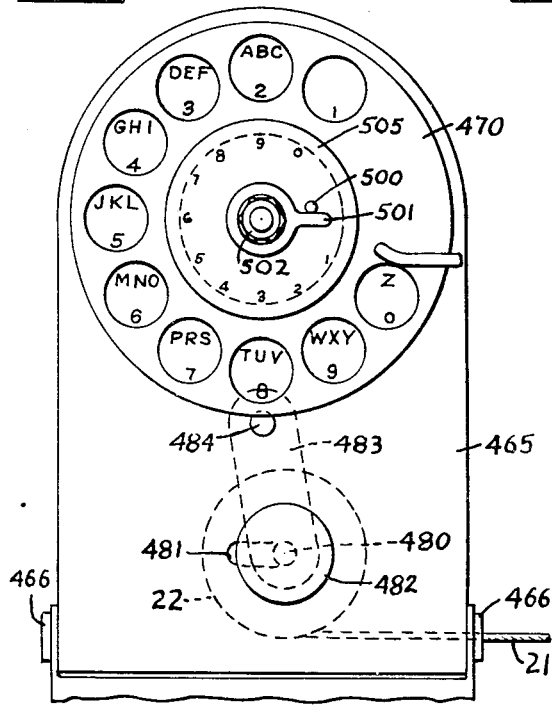

United States Patent Office 2,752,427
Patented June 26, 1956

2,752,427

CONTROL MECHANISM FOR AN AUTOMATIC TELEPHONE DIALER OR THE LIKE

James Kilburg, Burlingame, Calif., assignor to James Kilburg Corporation, San Mateo, Calif., a corporation of California Original application November 30, 1948, Serial No. 62,720. Divided and this application August 14, 1951, Serial No. 241,768

17 Claims. (Cl. 179—90)

This invention relates to control mechanism for devices for effecting automatic dialing of telephones. Such devices are designed for facilitating and increasing the speed of the telephone dialing operation and also, incidentally, for increasing the usefulness and the life of the telephone instrument and all mechanisms associated with the function of selecting a circuit by the dialing method. The present application is a division of my copending application entitled "Automatic Telephone Dialer," filed November 30, 1948, Serial No. 62,720, now Pat. No. 2,656,417.

The device of said co-pending application embodies essentially, a mechanism to be associated with a conventional telephone of the dial type. The mechanism includes a finger-like member insertable in one of the finger openings of the telephone dial or finger wheel and means to revolve and control the revolving movement of the finger member to accomplish selection or dialing of predetermined numbers through the conventional telephone circuits.

Said device also provides three distinct mechanisms for selecting the telephone number to be dialed, each of which mechanisms controls the dialing of the selected number through a single common control mechanism which forms the subject matter of the present invention.

The common control mechanism includes a clutch for transmitting power from a motive source to the telephone dial. Bearing in mind that in order to dial a selected telephone number of seven digits such as MA 1–4627, the dial must be actuated seven successive times each for a different fraction of a cycle, the control of this clutch mechanism becomes vital to the successful performance of the dialing mechanism. One object of this invention is to provide a clutch control meeting such dialing requirements and having the further advantage that it engages the clutch only for the required fraction of each cycle rather than for a complete or zero cycle for each digit. Another object is to provide an automatic clutch control that will cause engagement of the clutch only for the required number of fractional cycles so that upon dialing a number of less than seven digits, the clutch control will cease operation after the last digit is set up even though it be a single digit as "0" for calling "Operator."

In the device of this invention the dial control clutch is influenced by a set of selector dogs; seven groups of ten dogs each. The clutch carries a cylinder or barrel with seven sets of spirally arranged perforations and a selected dog of each group may be conditioned to advance into its complementary perforation to disengage the clutch at the fraction of a cycle required to dial the selected digit. There may, of course, be more or less than seven groups of dogs, seven being chosen as most telephone numbers are limited to seven digits.

In order to insure that the seven groups of dogs will operate separately and successively, a second barrel encloses the first barrel and has seven spirally arranged openings; one for each group of dogs. Rotation of the second or outer barrel, therefore, permits the selected dog of each group to advance to the inner or clutch control barrel only in its prearranged successive order.

With this main clutch control mechanism, three separate number selecting mechanisms may be employed with the same dial control mechanism. It is necessary that any number selecting mechanism include means selectively to control the advancing movement of the selector dogs to the end that one dog in each set representing a number from one to zero be permitted to advance to a position where it will act with the clutch control barrel in determining the extent of dialing movement imparted to the telephone dial.

One of the number selecting mechanisms includes a web or paper-like tape slidable between the dogs and the barrel. Perforations in this tape at any given position, will permit the selected dogs to advance toward their controlling positions. The paper-like web has the advantage that it also serves as a telephone directory and a portion of it can be exposed through a sight opening to display a subscriber's name while the code-like perforations in another portion of the same web or tape act to control dialing of the same subscriber's number. The device also includes means for punching said tape and labeling it to create the directory; all such means being conveniently and compactly arranged in a single device of convenient size.

A second number selecting mechanism comprises a bank of ten keys numbered and lettered in the manner of the finger openings in a standard telephone dial. These keys are useful in setting up a number not included on the paper tape directory and they provide a telephone dialing device operable by a key bank wherein any number to be dialed may be set up by the keys and will remain so set up until it is purposely cleared. One of the advantages of such an operation is that the number may be called repeatedly if the line is busy simply by closing the main circuit or depressing the main dialing key of the device.

A third number selecting mechanism comprises a bank of keys any one of which will, upon being depressed, set up an entire telephone number to be dialed. Such an arrangement is particularly useful for numbers most frequently called or for numbers which might be called in an emergency such as the police or fire department.

There are further specific objects and advantages of the invention which will best be understood and appreciated from a detailed description of a device which embodies the invention and such a description ensues with reference to the accompanying drawings wherein a preferred form of the invention is disclosed.

In the drawings:

Fig. 2 is an isometric view with parts broken away of a portion of the mechanism employed in keyboard dialing.

Fig. 3 is a similar view of a portion of the mechanism employed in code-key dialing.

Fig. 4 is a side elevation of a device embodying the present invention with the case broken away and with some of the mechanical parts illustrated in section.

Fig. 4a is a fragmentary detail in plan of a part of the top of the device illustrating the appearance of an indicating means.

Fig. 5 is a plan view of the same device with the case removed and with some parts broken away and some parts illustrated in section.

Fig. 7 is a fragmentary view in plan with parts in section of the motor and drive transmission of the device.

Fig. 8 is a view in side elevation of the structure illustrated in Fig. 7.

Fig. 9 is a fragmentary view taken on the center line of the main clutch control mechanism of the device.

Fig. 10 is a section taken on the line X—X of Fig. 9.

Fig. 11 is a sectional view taken on the line XI—XI of Fig. 9 with the clutch cover plate 131 removed.

Fig. 12 is a section taken on the line XII—XII of Fig. 9.

Fig. 13 is a section taken on the line XIII—XIII of Fig. 14.

Fig. 14 is a fragmentary view in elevation of an order control clutch and a reset clutch mounted coaxially with respect to the same shaft.

Fig. 15 is a longitudinal vertical sectional view taken through clutch control barrel and the order control barrel.

Fig. 16 is a sectional view taken on the line XVI—XVI of Fig. 15.

Fig. 17 is a view taken on the line XVII—XVII of Fig. 15.

Fig. 18 is a fragmentary detail view of a portion of the main clutch control mechanism.

Fig. 18a is an explanatory detail of a part of the same mechanism.

Fig. 19 is a fragmentary detail of a portion of a driving mechanism for the order control barrel.

Fig. 20 is a fragmentary sectional view showing a portion of the control mechanism for the order control barrel and is taken on line XX—XX of Fig. 15.

Fig. 21 is a similar view of another part of the same mechanism anl including reset mechanism associated therewith taken on line XXI—XXI of Fig. 15.

Fig. 22 is a fragmentary section of a portion of the clutch control mechanism taken on line XXII—XXII of Fig. 23.

Fig. 23 is an end elevation of the mechanism shown in Fig. 22.

Fig. 24 is a fragmentary section illustrating the construction and operation of a dialing key and mechanism associated therewith.

Fig. 25 is a view in end elevation of the mechanism shown in Fig. 24.

Fig. 26 is a detail in elevation of a part of the main switch control mechanism and part of the reset mechanism.

Fig. 27 is an isometric view of a control plate associated with the stack of code-key dialing plates shown in Fig. 3.

Fig. 28 is an isometric view of some of the reset and control mechanism disassociated from the other parts of the device.

Fig. 30 is a vertical sectional view through the code tape control drum and the mechanism through which it is controlled.

Fig. 31 is a sectional view taken on the line XXXI—XXXI of Fig. 30.

Fig. 32 is a sectional view taken on the line XXXII—XXXII of Fig. 30.

Fig. 33 is a sectional view taken on the line XXXIII—XXXIII of Fig. 30.

Fig. 34 is a section taken on the line XXXIV—XXXIV of Fig. 30.

Fig. 35 is a section taken on the line XXXV—XXXV of Fig. 30.

Fig. 36 is a fragmentary detail in section of a portion of the reset mechanism controlling the resetting of the selector dogs.

Fig. 37 is a fragmentary detail with parts in section of the same mechanism.

Fig. 38 is a section of another part of the reset control mechanism taken on the line XXXVIII—XXXVIII of Fig. 39.

Fig. 39 is a sectional view taken on the line XXXIX—XXXIX of Fig. 38.

Fig. 40 is a detail illustrating a drive connection between the reset mechanism and the tape control drum.

Fig. 41 is an isometric detail of a portion of the reset mechanism illustrated in Fig. 26.

Fig. 42 is a vertical sectional view of a punching device employed for punching perforated codes in the code tape.

Fig. 43 is a section taken on the line XLIII—XLIII of Fig. 42.

Fig. 44 is a section taken on the line XLIV—XLIV of Fig. 42.

Fig. 45 is a section taken on the line XLV—XLV of Fig. 42.

Fig. 46 is a fragmentary plan view of control mechanism associated with the code tape punching mechanism.

Fig. 47 is a view like Fig. 45 with the parts in different positions and with parts shown in section.

Fig. 48 is a plan view of telephone dial actuating mechanism associated with the device.

Fig. 49 is a longitudinal sectional view through the mechanism shown in Fig. 48.

Fig. 50 is a section taken on the line L—L of Fig. 49.

Fig. 51 is a fragmentary detail illustrating a governor mechanism associated with the main drive shaft of the device.

*Clutch control mechanism and number selection by paper tape*

Figure 1:
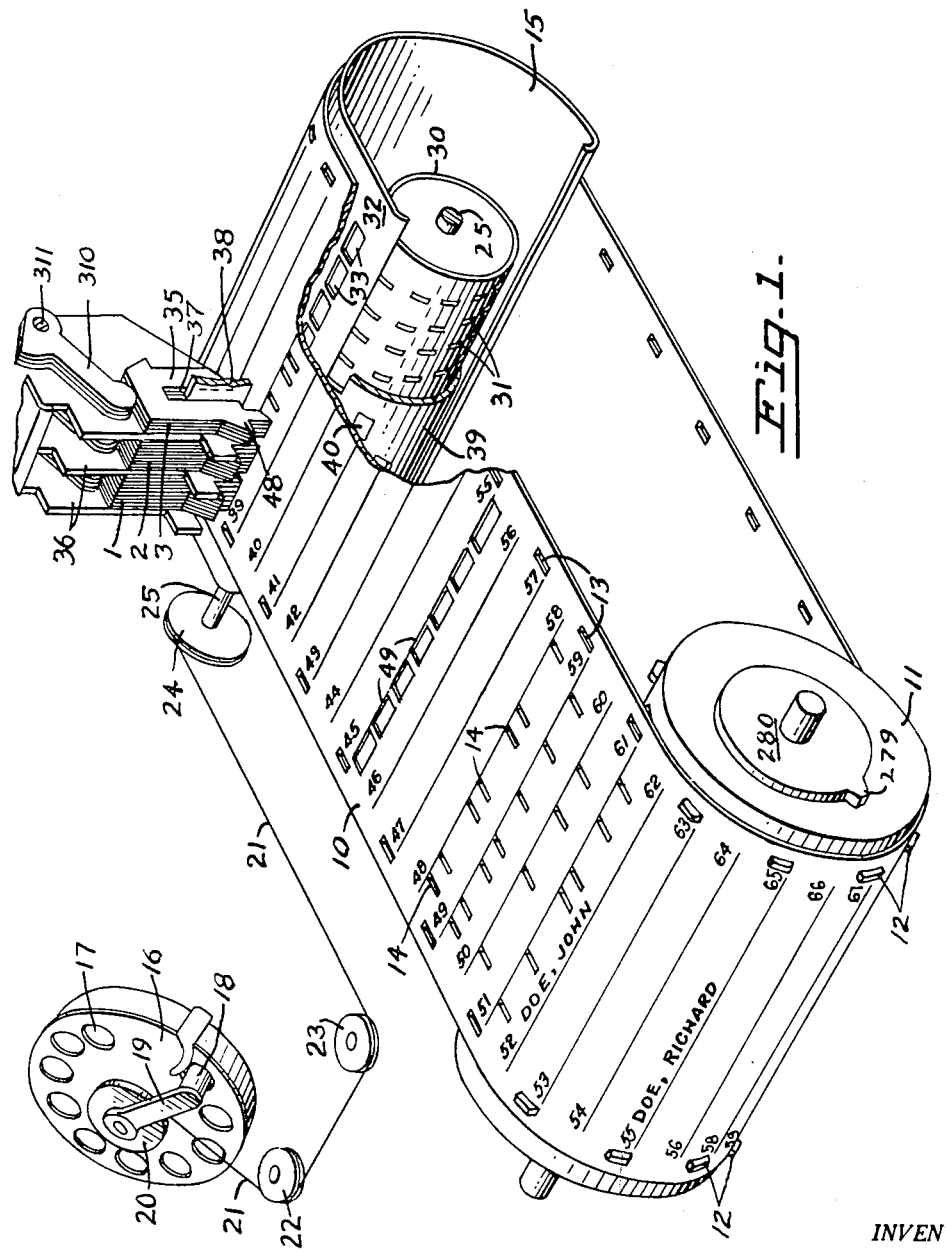
Fig. 1 is an isometric schematic view illustrating some of the basic mechanical principles involved in the present invention.

A clear understanding of the construction and operation of the device of this invention may best be had by first recognizing the general principles underlying the operation of its major parts and by reference to these parts disassociated from other structure. For example, in Fig. 1 of the drawings, those parts of the device are shown which form the principal controls for effecting motor driven dialing of a telephone number that has been coded by a single straight line of perforations in a paper-like web or tape. The term tape to be used hereinafter is to be taken as referring to any web or film of paper-like material capable of being readily perforated and having the desired strength and durability for this purpose. Such a tape shown at 10 in Fig. 1 is in endless form trained over a rotatable drum 11 with driving dogs 12 projecting through perforations 13 for accurately controlling the position of the tape. The tape 10 need not necessarily be an endless one so long as it is adjustably supported to enable a line of perforations in the tape to be moved into and out of operative relationship with other parts of the device. Opposed to the drum 11 there may be another drum or preferably, as shown, an arcuate guide plate 15 over which the tape slides to maintain it taut and to provide a flight or span of the tape disposed in a flat plane. The tape is divided into transverse spaces, as shown, to form areas of sufficient size to accommodate the typed or written name of a subscriber and a series of perforations 14 extending across the width of the tape. The aligned series of perforations occupying the space with a subscriber's name preferably does not pertain to that name but represents, in code, the telephone number of another subscriber whose name appears in a remote position on the tape. This enables the name to be exposed to view through a conveniently positioned sight opening in a case or cover while the perforate code corresponding to that name is disposed in operative relationship with mechanical selector dogs, presently to be described and disposed elsewhere in the device.

In Fig. 1 of the drawings, a telephone dial or finger wheel is schematically shown at 16 as having the conventional finger openings 17 for manual operation. A mechanical finger 18, preferably encased in rubber or other pliant material, projects into one of the openings 17, specifically the last or zero opening. This finger 18 is carried on an arm 19 adapted to swing about a central support with relation to the telephone finger wheel. Associated with the arm for driving it is a pulley 20 and wound about this pulley and secured to it is a cable 21. The cable 21 is of any suitable high tensile strength flexible material such, for example, as woven silk cord. This cable leads from the telephone dial to the dialing device of the present invention as for example over a series of guide sheaves illustrated at 22 and 23. The opposite end of the cable is secured to the periphery of the pulley 24 fixed on a driven shaft 25. This shaft is driven by a motor through a clutch and clutch control mechanism to be described in order to rotate the pulley 24 in a clockwise direction, as viewed in Fig. 1, to impart, through the cable 21, a rotary or dialing movement to the mechanical finger 18.

To dial a seven digit telephone number, it is necessary to rotate the pulley 24, and consequently the pulley 20, seven times in a clockwise direction and each individual rotary movement of the pulley 24 must agree in angularity with the position on a telephone dial of a particular digit of the number to be dialed. In further explanation let it be assumed that a standard telephone dial is rotated 60° for the digit one, 15° more for the digit two, 15° more for the digit three and so on. This is accomplished manually by inserting the finger in the numbered openings of the dial, rotating it clockwise until the finger stop is encountered, and permitting it to return. The return movement is spring actuated and governor controlled and through the dial impulse mechanism initiates electric impulses in numbers agreeing with the value of the digit dialed. The device of the present invention accomplishes the same end with the telephone dial by the slightly different expedient of maintaining the mechanical finger 18 in the zero position of the dial at all times and rotating it 60° only for the digit one and an additional 15° for each succeeding digit. The letters appearing with the numbers on the telephone dial and employed in connection with dialing a telephone number with a word prefix are, of course, translatable into numbers so far as the dialing operation is concerned and for the purposes of the present invention are considered numerically. The rotary movement of the pulley 24 is controlled by what may be termed an infinite cycle clutch in that the clutch may be engaged and disengaged for any number of cycles or for any fraction of a single cycle. In order, briefly, to understand the clutch control mechanism without first entering a detailed description of the clutch itself, let it be assumed that the clutch is normally engaged and driving the shaft 25 upon which the pulley 24 is mounted and let it be understood that the clutch may be disengaged simply by interrupting or engaging one of its moving parts. Connected to this moving part of the clutch is, as shown in Fig. 1, a barrel 30 disposed beneath the paper tape 10 and provided with seven sets of spirally arranged perforations some of which perforations are shown at 31. There are ten perforations in each of these sets and the angular relationship of the perforations in each set correspond to the angular relationship of the numbered finger openings on a standard telephone dial. Directly above the barrel 30 and beneath the tape 10 is a plate 32 formed as an extension of the arcuate guide plate 15 over which the tape is trained. This forward extension has seven perforations 33 the width of each perforation being sufficient to expose a complete set of ten spirally arranged perforations 31 in the barrel when the barrel is rotated. Arranged above the tape are seven groups of ten selector dogs 35. These groups are numbered from one toward seven, from left to right, there being about two and one half groups illustrated in Fig. 1, and the groups are separated by divider plates shown at 36. Each of the selector dogs has a central slot 37 embracing a common support and guide bar 38. This enables any one of the dogs to advance or move downwardly whenever it is permitted to do so.

Each group of ten dogs is aligned with one of the perforations 33 and consequently also aligned with the path of travel of one of the spirally arranged sets of perforations 31 in the clutch control barrel 30.

Now assuming that the telephone number 853 is represented by perforations in the tape 10. The perforations will be so arranged that the first is aligned with the eighth dog in group 1, the second will be aligned with the fifth dog in group 2 and the third will be aligned with the third dog in group 3. Thus, if the drum 11 is rotated to bring this perforated code directly beneath the lower ends of the dogs 35, the eighth, fifth and third dogs of groups 1, 2 and 3, respectively, will be free to advance downwardly through perforations in the tape and also through the perforations 33 in the plate 32 to ride on the periphery of the clutch control barrel 30. Any dog entering one of the perforations in the drum 30 will, of course, interrupt the rotation of the drum and disengage the clutch. The arrangement of the spirally disposed perforations 31 is such that the number of the dog in any group that has been released will enter the corresponding perforation in the set of perforations 31 disposed beneath that particular group of dogs. Now with the tape 10 perforated for the telephone number 853, the perforations will be so disposed that the first would underlie the eighth dog of the group 1, the second would underlie the fifth dog of group 2 and the third would underlie the third dog of group 3. This order would obviously continue through the other groups for telephone numbers with more digits. To effect dialing of the telephone through the medium of the perforated code in the tape, the tape is advanced as by rotation of the drum 11 until the selected perforations underlie the dogs 35. It is necessary now that the clutch control drum 30 be operated once for each digit of the number to be dialed and these operations must be in the correct progressive order and properly spaced as to time. Therefore, in order to prevent all of the selector dogs from engaging the barrel 30 at once, a second barrel or order control barrel 39, a part of which is shown in Fig. 1, surrounds and encloses the clutch control barrel. This barrel is also provided with a spirally arranged set of perforations 40 conforming in size, number and lateral spacing with the groups of dogs and with the perforations 33 in the plate 32. In dialing any multiple digit number, the order control barrel 39 is first disposed with its first or left-most perforation beneath the dogs of group 1. All of the other groups of dogs are retained against advancing into contact with the inner barrel 30 by imperforate portions of the surface of the barrel 39. With the clutch engaged, the barrel 30 rotates until the selected dog in group 1 enters one of the perforations in its group 1 set. This interrupts the rotation of the barrel and disengages the clutch. Then through automatic mechanism, presently to be described in detail, the order control barrel 39 is rotated or advanced one step. This retracts the group 1 dog and places the group 2 perforation 40 of the outer barrel in registry with the second group of dogs.

The manner in which the dog is retracted upon rotation of the outer barrel is best illustrated in Fig. 4 of the drawings wherein the lower end of the dog 35, shown as extending through both of the barrels, is illustrated as inclined to provide a cam surface. Thus, the end of the dog serves to stop the inner barrel as it enters its perforation because the inner barrel is rotating in a clockwise direction as illustrated in Fig. 4. The outer barrel, however, rotates in a counterclockwise direction so that the edge of its perforation through which the dog extends engages beneath the end of the dog to raise or retract it when the barrel is rotated. Now the barrel 30 is again set in motion by engagement of the clutch, and is stopped to disengage the clutch when the selected dog of group 2 enters its corresponding perforation 31. This operation continues until the coded number is completely dialed whereupon resetting of the mechanism is effected in preparation for dialing another number or for a repeated dialing of the same number if the tape 10 is not moved.

Keyboard dialing

The dialing of telephone numbers by code perforations in the tape, as just described, will be limited, of course, to the subscriber's numbers perforated on the tape. In ordinary home or business use of a telephone, the subscribers listed on the tape will be those frequently called and the ist thereon will be comparable to any list of subscribers ordinarily maintained to obviate the necessity for using a voluminous telephone book or index. In order to effect dialing of numbers infrequently called and numbers called possibly but once, the present invention includes a keyboard of ten keys labeled from "1" to "0" and bearing letters corresponding to the indicia appearing on an ordinary telephone dial. These keys shown at 45 in Fig. 52 as being arranged in two rows of five each, may be employed to set up a number to be dialed or, in other words, to control release of the dogs 35 in the proper order to effect dialing of a selected number through the clutch control barrel 30 and the order control barrel 39 as peviously described. The operation of keyboard dialing is schematically illustrated in a general way in Fig. 2 of the drawings. In this figure a dog selector plate 46 is shown as disposed in a horizontal position on a bed plate 47 upon which it is free to slide in right angularly related directions. That is, it may slide to the left or right or it may be advanced or retracted. When the dog selector plate 46 has been advanced, one of its edges underlies projections or noses 48 on the selector dogs 35 and thus supports all of the dogs in their raised positions. The plate 46 is disposed a short distance above the perforated code tape 10 and normally is retracted so that it does not interfere with the operation of the dogs 35. On the other hand during keyboard dialing, the tape 10 is advanced to a position where a series of large perforations 49 therein corresponding in size and spacing to the perforations 33 in the plate 32 register beneath the dogs so that they may be advanced to their controlling positions without interference by the tape 10.

The edge of the dog selector plate 46, which underlies the noses 48 on the selector dogs, has a series of equally spaced notches 50. The spacing of these notches corresponds to the spacing of the divider plates 36 between the groups of dogs and, in the advanced position of the plate 46, the notches 50 underlie the divider plates 36 and all of the dogs are retained in their elevated or retracted position because their noses 48 rest upon the plate. The ten keys 45 have depending stems 51 and the lower ends of two of these stems are shown in Fig. 2 as poised above index openings 52 in the plate 46. Upon depression of any one of the keys, a cam surface 53 on its stem engages the corresponding index opening to move the plate 46 either to the right or to the left a distance depending upon the number of the key depressed. Taking, for example, again the telephone number 853 to be set up by keyboard dialing, first the number 8 key will be depressed, sliding the plate 46 laterally until all of the notches 50 underlie the number 8 dog in each of the seven groups or orders. At this time all of the dogs will be retained in their retracted positions by latch plates, one of which is shown at 54 in Fig. 3. These latch plates, each of which supports a group of dogs, underlie noses 55 formed on the rear edges of the dogs. As the keys on the keyboard are depressed, indexing movement of the plate 46 to left and right is followed by retraction of the latches 54 one at a time successively from one toward seven. Now with the plate 46 in position to release all of the number 8 dogs, the latch 54 for the first order is retracted momentarily to release dog number 8 in the first order. Next, upon depression of key number 5, the plate 46 is indexed to the right or left until its notches 50 underlie all of the number 5 dogs. Latch 54 of the second order retracts and permits that particular number 5 dog to advance. Selection and advancing of the number 3 dog in the third order is effected in the same manner. The lower or controlling end of the released dog in the first order now rests on the clutch control barrel and the dogs in the other orders now rest upon the surface of the order control barrel 39 and will, upon stepped rotation of said barrel, advance to and enter the perforations in the clutch control barrel 30 to effect dialing of the telephone number as previously described.

The bed plate 47, upon which the dog selector plate 46 slides, is also perforated as shown to permit free downward movement of the key stems through the index openings 52. In order to prevent depression of the keys during operation of the machine with the perforated tape 10, a locking plate 56 overlies the plate 46 and has perforations, as shown, adapted to register with the index openings 52. This plate may slide from left to right for movement to and away from its locking position. In its locking position its perforations are moved out of registry with the index openings 52 and upon attempted depression of any key, the lower end of its stem will strike the locking plate.

Single key dialing

As distinguished from dialing by code perforations in a tape, and keyboard dialing just described, this invention provides for dialing a complete telephone number by depression of a single key. The purpose of single key dialing is to reduce to an absolute minimum the manual operations necessary to dial emergency numbers or other numbers most frequently called. The mechanism of the present invention through which single key dialing is accomplished differs in part from other mechanisms known to have been designed for this purpose in that it operates in association with the same control mechanism employed for the coded tape and the keyboard dialing.

Fig. 3 of the drawings illustrates schematically the mechanics of single key number selection and dialing. In this figure, a stack of code plates 60 is shown as disposed with one edge directly in front of the selector dogs 35, one of which is illustrated. The code plates are preferably of thin sheet metal and the stack may include any desired number agreeing with the number of single key dialing keys on the device, these keys being shown at 61 in Fig. 52. The lower end of one key stem 62 of one of the keys 61 is shown in Fig. 3 in its normal position poised above one of a set of slots 63 formed in all of the plates of the stack 60. Each of the plates in the stack has a bar, four of which are shown at 64, 65, 66 and 67, extending across one of the slots 63 and disposed for engagement by a cam surface 68 on the lower end of the key stem 62. Thus, upon depression of any one of the keys 61, it will engage the bar 64, 65, etc. of one only of the plates 60 and will effect advancement of that plate toward the selector dogs until an edge of the plate underlies the noses 48 of the dogs. That edge of the plate which advances toward the dogs may be referred to as the code edge and has formed in it a series of equally spaced slots 69 arranged to embrace the divider plates 36 (see Fig. 1) between the groups of dogs so that the divider plates will not interfere with the advancing motion of the plate 60. The spaces between the set of slots 69 therefore, each underlie the noses 48 of one group or order of dogs and these spaces are coded with notches 70, each notch, of course, underlying a dog in a group corresponding to the telephone number to be dialed when the key controlling the particular code plate is depressed. At the same time that the code plate 60 is advanced by the key stem toward the selector dogs, a pair of ears 72 on said plate engages the ends of sliding bars 73. These bars support a plate 74 with upstanding teeth 75 spaced on its upper edge. The teeth 75 engage in the latch plates 54 which are normally supporting the dogs 35 in their retracted positions so that movement of a selected code plate 60 will be accompanied by movement of the bars 73 and plate 74 and all of the selector dogs will be freed by retraction of the latch plates 54 to advance until their forward noses 48 rest upon the selected code plate. Only that dog in each group overlying one of the code notches 70 will advance further and until its end rests upon the order control barrel 39 it being understood, of course, that during this operation the code tape 10 occupies the position with the large openings 49 directly beneath the ends of the selector dogs. Now, upon motor driven operation of the machine, which will be initiated also by depression of the same single key, the telephone number coded on the code edge of the plate will be dialed.

The position occupied by the stack of code plates 60 is illustrated in Fig. 4 of the drawings where they are shown as directly beneath the bed plate 47 (Fig. 2) and supported above the code tape 10 by a stationary plate 77 (see also Fig. 5) which extends transversely across the machine between side plates 78.

Referring to Figs. 2, 3 and 4, the key stems 62 are shown as having a cam surface 80 adjacent their lower ends opposed to the cam surfaces 68 thereon which, upon depression of any one of the keys engages an edge of one of a pair of elongated openings 81 (Fig. 2) in the index plate 46. This effects retraction of the index plate upon depression of any one of the keys 61 away from the selector dogs and particularly out from under the noses 48 on the dogs so that they are free to advance in response to the single key dialing operation.

Because the code plates 60 rest in direct contact with each other, there is a tendency upon advancing any single code plate for the contacting plates directly above and below it to advance with it through frictional contact. This tendency is overcome by cam ears 84 projecting laterally from the edges of the code plates as shown in Figs. 3 and 5. There is one such ear on each plate alternately disposed in the stack so that while the uppermost plate has an ear 84 projecting from its right side; the ear on the next lower plate projects from the left side and so on. Thus, a pair of springs, one of which is shown at 85 in Fig. 5, resist the forward movement of all of the plates 60 by engagement with the cam ears 84. Consequently, when any single one of the plates 60 is advanced by its key stem 62, one of the springs 85 rides over the cam ear of that plate and the opposite spring 85 remains in engagement with the cam ear of the plate 60 next above and the plate 60 next below to retain them against advancing movement.

*General assembly and power transmission*

Figure 6:
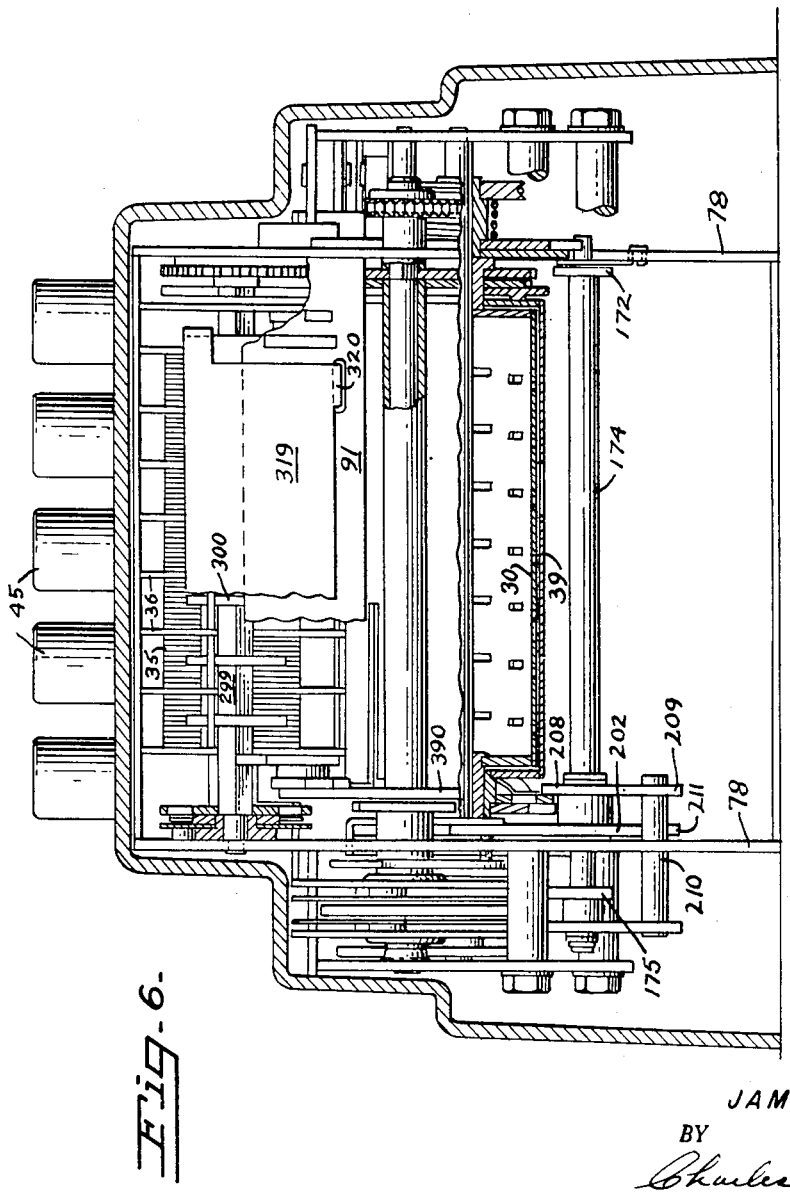
Fig. 6 is a view in rear elevation of the same device with the case broken away and with some of the mechanical parts broken away and some shown in section.

Referring to Figs. 4, 5 and 6 of the drawings, most of the operative parts of the device are shown as supported by a framework consisting of the pair of vertically disposed side plates 78 which are held in spaced relation by suitable spanning members such as a plate 90 at the lower edges of the plates, a bar 91 at their rear edges and the bed plate 47 (see Fig. 2) at their top edges all of which spanning members are staked or otherwise suitably secured to the side plates 78. The side plates are thus rigidly supported to act as bearings for many of the shafts of the machine which are transversely disposed. A motor comprising a winding 93 (see also Figs. 7 and 8), a laminated stator 94 and a rotor (not shown) on a rotor shaft 95 disposed outwardly of one of the side plates 78 and secured thereto as by bolts 96. The bolts 96 also support a pair of triangular shaped plates 97 which support bearings 98 for the motor shaft and also provide bearings for some of the gear shafts driven by the motor.

Motive power is transmitted to the pulley 24 which actuates the telephone dial through a train of gears best shown in Figs. 7 and 8 and including a gear 101 on the rotor shaft 95, a gear 102 and a gear 103 mounted on the same hub as the gear 102. The gear 103 meshes with and drives a gear 107 which in turn drives gear 108 concentrically and rotatably supported with relation to the main shaft 25 upon which the pulley 24 is supported. The gear 108 is fixed to the driving part of a clutch generally indicated at 110, to be referred to as the main clutch, that imparts driving movement to the shaft 25 and pulley 24 and is controlled for disengagement by the clutch control barrel 30.

Referring again to the gear 103, a large gear 104 also meshing therewith is shown as mounted on a common hub with a gear 105 meshing with and driving a gear 106. Fixed to the latter gear are the driving parts of two clutches, one of which generally indicated at 111 functions to control movement of the outer or order control barrel 39. The other clutch generally indicated at 112 is a reset clutch the function of which is to return all of the parts of the machine to starting positions after each dialing operation. The outer ends of the main shaft 25 and a shaft 113, which may be referred to as the reset shaft, extend beyond the side plate 78 for the support of gears and clutches as shown and preferably made rigid at their extending ends by an auxiliary bearing plate 114 supported and spaced with relation to the side plate 78 as by studs indicated at 115. A switch, not yet disclosed in the motor circuit is closed upon the initiation of any dialing operation so that motion is transmitted through the gearing described and through the main clutch 110 to drive the inner barrel 30. When a selector dog of the first order drops into an opening in the inner barrel, the clutches disengage and the first digit of the selected telephone number has been dialed. At this time, the clutch 111 is engaged to rotate the order control barrel 39 from its first to its second position and as it is disengaged, the clutch 110 is again engaged to effect controlled dialing of the second digit in the selected telephone number. This alternate operation of the clutches 110 and 111 continues until the telephone number is completely dialed. Upon completion of the dialing, the clutch 112 is engaged to initiate the operation of reset mechanism to reestablish normal positions of all of the parts in readiness for the next dialing operation.

*Clutches and clutch control*

The construction and operation of the main clutch 110 are illustrated in Figs. 9, 10, 11 and 12. In Fig. 9 the gear 108 is shown as mounted concentrically with the shaft 25 but supported for limited relative rotation on a hub 117 to which a collar 118 is securely fastened, as for example by being pressed in place thereon. This hub also carries an integrally formed shoulder 119 (see Fig. 11) with diametrically opposed radially projecting lugs 120 and 121 thereon. A helical spring 122 forms a connection between the collar 118 and the gear 108 normally tending to rotate the gear in a clockwise direction as viewed in Fig. 11 until a pair of pins 123 in the gear abut the lugs 120 and 121. It may be considered therefore, that the gear 108 and the hub 117 are rotatable about the main shaft 25, through the medium of a suitable bearing bushing 124, as a single part subject to the limited relative rotation of the gear 108 relative to the hub 117 and influenced by the spring 122. The hub 117 also carries a ratchet disk 125, shown in Fig. 10, as having two ratchet teeth thereon though more or less teeth may be employed if desired. The hub 117 and its related parts including the ratchet disk 125 comprise the driving part of the main clutch. The driven part of the clutch is a large disk 126 carrying a pawl 127 pivoted thereto and having a latching end 128 engageable with the teeth of the ratchet disk 125. The pawl 127 is pivotally connected to the driven disk 126 as by a pin 129 and the disk has a plurality, preferably three, of laterally projecting lugs 130 to which a cover plate 131 may be secured as by staking or the like. This cover plate serves to retain the pawl 127 in place and also serves to retain in operative position, a pawl spring 133 which urges the pawl into engagement with the ratchet disk and is wound about a post 132 and anchored by an end engaging one of the laterally projecting lugs 130 as shown in Fig. 10. The pawl 127, therefore, controls the operation of the clutch to the extent that if the pawl is permitted to move inwardly under influence of the spring 133, its latch end 128 engages a tooth of the ratchet disk 125, as illustrated in Fig. 10, and motive power transmitted through the gear 108 is also, therefore, transmitted through the ratchet disk 125 and pawl 127 to drive the driven disk 126 and through it the main shaft 25. The function of the spring 122, permitting relative movement of the gear 108 on the balance of the driving member of the clutch, may now be understood as preventing partial or insecure engagement of the pawl with the ratchet disk 125. For example, assuming that the pawl, being in a stationary position, is urged in by the spring 133 for engagement with the rotating ratchet disk 125 precisely at the time that one of the teeth on the ratchet disk is aligned with the pawl, it is likely that the pawl will come into partial engagement with that tooth and such engagement might be so slight that upon the application of torque, the engagement would be lost and the clutch would fail to function. This would occur under conditions where the driving torque and the friction between the partially engaged pawl and ratchet tooth were greater than the force of the spring 133 tending to urge the pawl to its fully engaged position. Now because of the interposition of the spring 122 between the gear 108 and the hub 117, which in effect is between the gear 108 and the ratchet disk 125, the driving torque is limited to the tension of the small spring 122 which is less than the effective tension of the spring 133 and this condition prevails until the pins 123 (Fig. 11) in the gear 108 have moved into engagement to effect a positive drive. During this short period the spring 133 has had ample time to drive the pawl home to its fully engaged position with the ratchet tooth and the possibility of incomplete or faulty clutch engagement is entirely obviated.

A tail 135 on the pawl 127 projects beyond the periphery of the driven disk 126 presenting means to swing the pawl against the tension of the spring 133 to effect disengagement of the clutch. As this is the main clutch for imparting movement to the main drive shaft 25 which is in turn responsible for the actual dialing movement of the telephone dial, it is under control of the clutch control drum 30 as previously described. This drum, as shown in Fig. 9, is directly connected with a bushing 136 mounted for limited relative rotation on the shaft 25 and carrying a clutch control disk 137. This clutch control disk has a laterally projecting lug 138 (see Figs. 10 and 12) at its periphery adapted to cooperate with the tail 135 of the clutch pawl 127 in the following manner. When the clutch is engaged, as shown in Fig. 10, its tail 135 engages the lug 138 and drives the control disk 137. This also imparts driving movement to the barrel 30, it being understood that the resistance to rotary movement of the barrel with relation to the shaft 25 is very small. Further, during this driving movement, the clutch control drum and its bushing 136 are rotating with the shaft.

Assuming that the clutch is in its engaged or driving position and is performing its function of imparting rotation to the telephone dial, the clutch control disk 137 and the barrel 30 are also rotating. Now, if one of the selector dogs 35 of Fig. 1 enters one of the perforations 31 in the control barrel, its movement is interrupted as is the movement of the directly connected control disk 137. Consequently, continued movement of the clutch pawl 127 causes depression of its tail 135 by the lug 138 and instantaneous disengagement of the clutch. The angle of rotation between the clutch control disk 137 and the driven part 126 is limited in one direction by engagement of a lug 140 on the disk 137 with one of the lugs 130 on the driven part and in the other direction by engagement of the lug 138 on the disk 137 with a projecting nose 141 on a clutch latch lever 142.

The clutch latch lever 142, just mentioned, functions to latch the clutch in its disengaged position until all conditions prerequisite to clutch operation have been satisfied. This latch lever, as illustrated in Figs. 10 and 12, is pivoted as by a pin 143 carried by the driven disk 126 of the clutch and is urged to swing outwardly as by a spring 144 wound about a post 145 also carried on the disk 126 and anchored in a hole 146. Therefore, upon disengagement of the clutch when the tail 135 of the clutch dog is depressed and the disk 126 carrying the latch 142 moves clockwise relative to the disk 137, a latch shoulder 148 on the latch 142 engages an undercut edge 149 on the lug 138 preventing relative movement of the driven disk and the control disk in the opposite direction which movement is necessary to release the clutch pawl 127 for reengagement of the clutch. Before the clutch can again be engaged, it is necessary to release the latch 142 by swinging it clockwise about its pivotal support 143 either by engagement with the nose 141 or by engagement with a projecting end 150 to swing the end toward a radially extending lug 151 projecting from the periphery of the clutch control disk 137.

The clutch 111, for controlling the operation of the outer barrel, and the reset clutch 112 are of simpler construction than the main clutch just described though they may be considered as operating on the same principle. These clutches shown in Fig. 7 as having a common driving gear 106 are shown in further detail in Figs. 13 and 14 wherein the gear 106 is illustrated as pressed upon and rotatable with a common driving ratchet 155. The gear 106 is centrally positioned with respect to the thickness of the ratchet 155 so that a toothed portion of the ratchet projects outwardly from opposite sides of the gear for cooperation with a driven disk 156 of the outer barrel clutch 111 and a driven disk 157 of the reset clutch 112. The disks 156 and 157 are of identical construction and are identical also with the disk 126 of the main clutch shown in Fig. 10. They carry pawls 158 and 159, respectively, influenced by springs 160, as shown in Fig. 13, identical with the spring 133 of Fig. 10. The pawls 158 and 159 have tails 161 and 162, respectively, projecting beyond the peripheries of the driven disks 156 and 157 so that they might be engaged by means presently to be described to urge them inwardly in order to effect disengagement of the clutch. The ratchet disk 155 serving as the driving part for both of the clutches 111 and 112 is preferably provided with a greater number of ratchet teeth such as the eight teeth shown in Fig. 13 and this insures more prompt engagement of the clutch which is desirable in actuating the order control barrel and the reset mechanism. The ratchet disk 155 is freely rotatable on the shaft 113 through the medium of a bearing bushing 164 so that it is free to rotate with the driving gear 106 until either one of the clutches is engaged. The driven disk 156 of the order control barrel clutch 111 is fixed to a bushing 165 (see also Fig. 7) rotatable with respect to the shaft 113 and carrying a Geneva driver 166 which imparts rotation to the order control barrel as presently to be described. The driven disk 157 of the reset clutch 112 is fixed to the shaft 113 for rotating said shaft when the clutch is in engagement and, through such rotation, effecting the several separate operations necessary for resetting the device after dialing operation has taken place.

Referring back to the description of the main clutch and the main clutch control barrel 30, it should be recalled now that each time a dialing operation of the device is initiated the main clutch is engaged to drive the shaft 25. The forward driving motion of the shaft 25 continues until a selector dog of the first order enters a perforation in the main clutch control barrel 30 and then the shaft 25 is returned to its original or normal position. During this operation, the order control barrel 39 must be moved forwardly one station to permit the selector dog in the second order to enter the main clutch control barrel. The engagement of the clutch 111, which controls the outer barrel or order control barrel, takes place during the return movement of the shaft 25 and the manner in which it engages and operates is disclosed in Figs. 15 to 21 inclusive.

Referring to Figs. 15 and 17, the shaft 25 is shown as carrying a bushing 168 fixed for rotation with the shaft and supporting the pulley 24. Also fixed to the bushing 168 is a cam disk 169 which, as shown in Fig. 17, has a single relieved portion or notch 170 in its periphery. When the shaft 25 is rotated by the main clutch for the dialing of any number from 1 to 0, the notch 170 in the disk 169 advances clockwise as viewed in Fig. 17 through an arc which swings it at least beyond the vertical center line of the shaft. The periphery of the disk 169 normally engages the pin 171 on a lever 172 to prevent upward swinging movement of that lever under tension of a spring 173. The lever 172 is carried on a shaft 174 which, as best shown in Fig. 6, extends transversely throughout the width of the machine and carries on its opposite end a clutch control finger 175.

Upward movement of the lever 172 rocks the shaft 174 and finger 175 clockwise to release the finger 175 from its engagement with the tail 161 of the outer barrel clutch control pawl 158 (see again Figs. 13 and 14). This, engagement of this clutch takes place to advance the outer barrel or order control barrel one station. This engagement of the outer barrel control clutch must not take place during the forward dialing movement of the shaft 25 but only upon its return movement. For this reason a control plate 176 is rotatably mounted on the bushing 168 and urged into frictional contact with the disk 169 by means of a spring 177 under compression between the pulley 24 and the control plate 176. The lower edge of the control plate 176 is provided with a notch 178 and an adjacent shoulder 179 which, as shown in Fig. 17, normally engages the pin 171 and acts, in addition to the periphery of the cam 169, to prevent upward movement of the lever 172.

When the shaft 25 is being driven forwardly, which is clockwise as viewed in Fig. 17, the friction imposed by the spring 177 between the control plate 176 and the cam 169, tends to carry the control plate 176 also in a clockwise direction and thus as the notch 170 passes the pin 171, the lever 172 is prevented from moving upwardly. However, after the selected digit has been dialed and the shaft 25 is rotating in the opposite direction, the control plate swings with it positioning the notch 178 directly over the pin 171. Therefore, during this return movement, as the notch 170 on the cam 169 passes the pin 171, the lever 172 is permitted momentary upward movement to release the pawl 158 and effect engagement of the clutch 111 to advance the outer barrel. As the finger 175 immediately resumes its normal position shown in Fig. 17, this clutch is engaged for a single cycle only and effects one complete rotation of the Geneva driver 166 associated with its driven part. The Geneva driver 166, as best shown in Fig. 19, will, upon clockwise rotation, engage a toothed Geneva wheel 183 which, as shown in Fig. 15, is fixed to a bushing 184 also carrying an end plate 185 of the outer barrel 39. The teeth on the Geneva wheel 183 correspond in angular spacing to the angular spacing of the perforations 40 in the outer barrel so that the barrel is adjusted from one order position to the next succeeding order position upon each operation of the Geneva driver 166.

This advancing movement of the outer barrel from the first to the second order or from the second to the third order and so on, should be effective to initiate further dialing operations only if there is another number to be dialed or, in other words, only if a selector dog had been released to effect dialing of a number in the next order.

For example, assume that a single digit telephone number such as "0" for calling operator is being dialed; obviously it is unnecessary after the single digit has been dialed in the first order that the device should continue its operations through seven orders and it is a distinguishing feature of the present device that its operation is discontinued immediately upon the completion of the cycle of the last digit in the number to be dialed no matter how short the number might be. This advancing movement of the outer barrel to its next order position, which takes place after the dialing of each digit, may therefore be considered as a sensing movement, as the outer barrel moves forwardly for a time sufficient to determine whether a selector dog is in position to be received in the next order. In the absence of a selector dog, the outer barrel will reverse and in reversing, will initiate a reset operation of the device.

The sensing mechanism is shown in Figs. 20 and 21 wherein a cam 190 with a rise 191 on its periphery is illustrated as carried for rotation with the same bushing 165 that carries the Geneva driver 166. Therefore, upon rotation of the Geneva driver to advance the outer barrel, the rise 191 engages and moves clockwise a lever 192 on a shaft 193 (see Fig. 21) which also extends transversely of the device and carries a pawl 194 arranged for interrupting engagement with the spaced teeth 195 of a disk 196 rotatable, as also shown in Fig. 15, with relation to the main shaft 25 and disposed in opposition to an end plate 197 of the outer barrel. The disk 196 is permitted limited relative rotation with respect to the end plate 197 by a pin 198 (Fig. 20) carried by the disk 196 and projecting into an arcuate slot 199 in the outer barrel end plate. A torsion spring 200 (see Figs. 15 and 21) acts between the outer barrel end plate 197 and the disk 196 normally to urge the pin 198 toward one end of the slot as shown in Fig. 20. Therefore, during the advancing movement of the outer barrel when the rise 191 on the cam 190 swings the pawl 194 upwardly, the end of the pawl engages one of the teeth 195 and interrupts the forward motion of the disk 196 about half way in the travel of the outer barrel toward its next order position. The barrel continues its motion but in doing so imposes further tension on the already preloaded spring 200 sufficient, if necessary, to return the outer barrel to the order position which it just left after the Geneva driver 166 (Fig. 19) has left its engagement with the toothed Geneva wheel 183. The rise 191 on the cam 190 extends throughout an arc of sufficient magnitude to retain the disk 196 in its spring tensioning position until the outer barrel has attained its advanced position and until a selector dog has had an opportunity to advance through one of the perforations 40 therein. Continued rotation of the cam 191 releases the pawl 194 with either one of two possible results. If a selector dog in the order to which the outer barrel has just moved has been conditioned to advance, it has now advanced through the perforation 40 of the outer barrel and will prevent reverse rotation thereof. In this case, upon release of the pawl 194, the spring 200 will cause the disk 196 to advance and again assume its normal position with relation to the outer barrel. On the other hand, if no selector dog was conditioned to advance in this order, nothing prevents limited reverse movement of the outer barrel and the spring 200 causes its return to its normal position with respect to the disk 196. This, however, takes place while the rise 191 on the cam 190 is still holding the pawl 194 in engagement with a tooth 195 of the disk 196. It is important to the successful operation of the device that while an advanced selector dog will prevent reverse rotation of the outer barrel, it prevents such rotation only momentarily; that is, while the rise 191 of the cam is holding the pawl 194 against a tooth 195. Immediately upon the rise of the cam passing its engagement with the lever 192, the pressure of the barrel against the dog is released freeing the dog for its further advancing movement toward the inner barrel which controls the digit to be dialed.

In brief summary of the foregoing, upon each engagement of the main clutch to dial a single digit of a telephone number, the outer barrel control clutch is also engaged to advance the outer barrel to its next order position. If, on the one hand there is a further digit to be dialed, another operation of the main clutch will be initiated and if on the other hand no further digit remains to be dialed, the order control barrel will be returned and will initiate an operation of the reset clutch, one function of which is to bring the device to a standstill and condition all of the parts for the next complete dialing operation. Therefore, next in order will be described the manner in which the next successive operation of the main clutch takes place as for example, if another digit remains to be dialed.

Returning to the operation of the main clutch as it is disclosed in Figs. 9, 10 and 12, it must be recalled now that the motor driven ratchet wheel 125 is engaged by the pawl 127, thus driving the clutch disk 126 and the control plate 137 and the clutch control barrel 30. Upon interruption of the movement of the clutch control barrel as by a selector dog entering one of its perforations, the control disk 137 is stopped so that the continued relative movement of the driven part of the clutch advances the tail 135 of the pawl 127 to beneath the lug 138 to disengage the clutch. Referring momentarily to Fig. 1, the pulley 24, also fixed to the shaft 25, performs its dialing function through the cable 21 under tension of a spring, later to be described, and this spring upon disengagement of the main clutch returns it to its starting position. This return movement of the clutch driven plate 126, which is counter-clockwise as viewed in Fig. 10, carries with it the control plate 137 and barrel 30 so that there is no relative movement between the control plate and the clutch so the clutch remains in its disengaged position. The return movement of the control disk 137 with the clutch driven plate is assured because of the latched engagement between the lever 142 with its notched part 148 engaging the chamfered edge 149 of the lug 138 on the control disk. As this latched connection must be broken to enable re-engagement of the main clutch, it is desirable that during the last increment of return movement of the main clutch to its normal position, the latch be released and so conditioned that if the main clutch is to be engaged to dial another digit, the released condition will prevail. However, when the last digit has been dialed and the device is to come to rest, the latched condition of the main clutch should be reestablished. To accomplish this, a pawl 202 (Fig. 18) pivotally mounted on the shaft 174 is biased as by a spring 203 toward the periphery of the control plate 137 in a position to engage the end 150 of the lever 142 to release it from its latching engagement just as the clutch is returned to its starting position. The spring tension returning the clutch to this position is sufficient just to release this latching engagement but insufficient to effect relative movement between the clutch and control plate to release the pawl 127 for reengagement of the clutch. The clutch should be reengaged only if a further digit remains to be dialed and the order control barrel 39 has therefore not undergone a motion in reverse direction. Following first the mechanism employed for initiating a further operation of the main clutch, a cam 204 is shown in Fig. 19 as carried by the same hub 165 that supports the Geneva driver 166. Therefore, after the Geneva driver has advanced the Geneva wheel 183 and the outer barrel to its next order position, the cam 204 (see also Fig. 23) engages the lobe of a cam 205 supported and fixed relative to the large driven disk 126 of the clutch imparting to it counter-clockwise rotation as viewed in Fig. 10 just sufficient to release the tail 135 of the dog 127 from beneath the lug 138 on the clutch control disk, thus engaging the clutch for another operation. The connection of the cam 205 with the clutch driven disk is shown in Figs. 22 and 23 as a pair of lugs 207 bent from the cam 205 and projecting into suitable holes in the clutch disk 126 for driving engagement. In order that these lugs do not interfere with the movement of the interposed clutch control plate 137, that plate is provided with arcuate slots 206 through which the lugs move freely during relative rotary movement of the parts.

If the order control barrel, upon its advance to the next order, senses the absence of a selector dog in the next order its consequent reverse movement, previously described, will effect relatching of the clutch through the medium of the latch lever 142. This takes place through the medium of a lever 208 (see Fig. 18) also rotatable on the shaft 174 and having a tail 209 engaging a pin 210 carried by a clutch release finger 224 (see Fig. 16) for engagement with a tail 211 on the pawl 202 (see also Fig. 6). The pin 210 normally engages the tail 211 of the pawl 202 to prevent the pawl from swinging too far under the influence of its spring 203 and to provide some clearance between the nose of the pawl and the periphery of the clutch control disk. The pin 210 may also serve to release the pawl 202 from its engaged position with respect to the clutch latch upon upward movement of the lever 208. A spring 213 normally urges the lever 208 upwardly but it is retained against such upward movement by a pin 214 carried by the lever and engaging a control plate 215 (see Fig. 16) somewhat similar in construction and function to the control plate 176 of Fig. 17. The control plate 215 is supported by the bushing 184 for free swinging movement relative thereto and about the axis of the shaft 25 upon which the bushing is carried. The control plate is notched to provide radial shoulders 216 spaced 45° to correspond to the spacing of the order positions of the order control barrel. The end 185 of the order control barrel carries a pair of spring pawls 217 (Fig. 15) which upon forward movement of the barrel ride over the shoulders 216 in the control plate 215 but, upon reverse movement thereof, engage the shoulders 216 to swing the control plate 215 clockwise as viewed in Fig. 16, thus enabling the pin 214 on the lever 208 to leave a supporting shoulder 219 and swing upwardly into a notch 220 formed in the bottom of the control plate. As the lever 208 moves upwardly under influence of its spring 213, it releases the pawl 202 (Fig. 18) from its clutch latching position so that the clutch latch 142 springs upwardly to its latching position and out of reach of the end of the pawl 202 when it returns. The pawl will return to rest with its nose on top of the radially extending lug 151 which has been advanced with the control plate when the main shaft, the main clutch and the control plate 137 are urged to their true starting position by the spring in the dialing mechanism. This is the final part of the motion that was interrupted when the pawl 202 engaged the end 150 of the latch lever 142. The return of the lever 208 will take place shortly after the operation just described and when the reset mechanism, in a manner to be described, returns the order control barrel 39 and the Geneva wheel 183 to starting position. In this motion, one tooth of the Geneva wheel will engage the pin 214 of the lever 208 depressing the lever for reception of the pin onto the shoulder 219, the control plate 215 having been moved counter-clockwise by endwise frictional engagement of the springs 217 as they bear against it and slide over the shoulders 216.

It has been shown that when a telephone number has been completely dialed the order control barrel, upon moving forward, fails to sense the presence of a selector dog and thereby conditions the main clutch against a further operation. Next, the entire device must be restored to a condition in readiness for the next dialing operation of a different telephone number. The restoring and resetting of the several operable elements of the device is accomplished by reset mechanism driven by the reset clutch previously described. Engagement of this clutch is effected by the same upward swinging movement of the lever 208 (Fig. 16) that took place immediately succeeding the dialing of the last digit of the telephone number just dialed. The pin 210 by engagement with the tail 209 of this lever 208 imparts movement to the clutch release finger 224 by which the pin is carried. The clutch release finger 224 is carried on a bushing 225 rotatable on the same shaft 174 that carries the release finger 175 of the order control clutch. Thus, when the lever 208 swung upwardly, it also rotated the finger 224 clockwise and out of engagement with the pawl 162 of the reset clutch 112 (see Figs. 13 and 14) effecting engagement of the clutch and initiating a full cycle operation of the reset shaft 113. The several reset functions accomplished by this operation of the shaft 113 will be described in detail under the title Reset Mechanism

Starting for number selection by paper tape

It is to be recalled that the device of the present invention is adapted to dial telephone numbers in three distinct manners; that is, by a perforated code in a paper tape, by a keyboard and by a single key or code key. The starting and operation of the device under control of the perforate tape will now be described in detail without reference, however, to the particular mechanism employed in controlling the tape position, because such mechanism relatively complex in itself, also embodies parts for neutralizing or controlling the position of the tape when the device is operated by keyboard or code key and will be most readily understood after these operations have been fully described.

When any number represented by perforated code on the tape 10 is to be dialed, the drum 11 is rotated to bring the perforated code in registry beneath the selector dogs 35. A starting of dialing key is then depressed to close a switch to the electric motor to effect engagement of the main clutch and to release the dogs 35 for engagement with the paper tape so that their operation will not be interfered with either by the keyboard dialing mechanism or by the code plates employed in conjunction with single key or code key dialing. The starting or dialing key is that shown at 227 in Fig. 52 being the foremost right hand key in the code key group though it will be understood that another key distinct in position and location from the dialing keys may as well be employed for convenience if desired. The construction and function of this dialing key 227 is best illustrated in Figs. 24 and 25 with reference also to Fig. 2. The key 227 has a stem 228 with a forward cam surface 229 adjacent its lower end and a similar but opposed rearward cam surface 230. The forward cam surface 229 is contiguous with a vertically disposed relieved portion 231 which terminates in a shoulder 232. The key 227, like all of the code keys and other dialing keys heretofore described, is provided with a generally cylindrical cap 233 at its upper end guided in a plate 234 (see also Fig. 4). The stem is also guided in a plate 235 and a spring 235a interposed between the cap 233 and the plate 235 normally tends to hold the key and its stem in their uppermost position. Upon depression of the key 227 in opposition to the force exerted by the spring 235a, its forward cam surface 229 first engages an opening 239 in an L-shaped control plate 239a (see Fig. 2) engageable with the upper ends of a clutch control lever 237a and a switch control lever 237 to swing both of said levers rearwardly. Considering first the effect of this movement of the lever 237 on the switch which energizes the motor, Fig. 26 shows the switch control lever 237 as pivotally supported on a pin 238 and adapted, when swung toward the right by the control member 239a, to engage a pin 240 on a main switch control member 241. The main switch comprises a fixed contact 242 and a resiliently supported normally spaced contact 243. A dielectric stud 244 projects outwardly from the main switch control lever member 241 underlying the resilient contact member 243 in a position to urge it upwardly into contact with the member 242 for closing the circuit to the motor. The main switch control member 241 is pivotally supported at one end as by a pin 246 and an elongated slot 247 embracing said pin to permit longitudinal as well as swinging movement of the member 241. Normally, the member 241 is latched in a downward position by a latch lever 248 overlying a laterally projecting ear 249 of the member 241. When the L-shaped control plate 239a is moved as by depression of the dialing key as just described, the switch control lever 237 is swung to the right as viewed in Fig. 26 thus releasing the member 241 from beneath the latch 248 and permitting it to move upwardly under tension of a spring 250 so disposed as to bias the member 241 both upwardly and to the right as viewed in Fig. 26. Thus, depression of the dialing key has energized the motor.

At the same time the main clutch has been conditioned for engagement by the lever 237a (Fig. 2) which is fully illustrated in Figs. 18 and 18a. This lever, pivotally supported as at 252, has a bifurcated end with an upper ear 253 and a lower ear 254 (see Fig. 18a) bent laterally outwardly in opposite directions from the plane of the lever itself for engagement with part of the main clutch. Recalling the operation of the main clutch by reference to Figs. 10 and 12, the counterclockwise movement of the lever 273a imparted to it when the dialing key is depressed, will raise its bifurcated end so that the lower ear 254 thereon engages and depresses the nose 141 of the clutch latching lever 142 releasing the latching engagement with the part 138. Simultaneously the upper ear 253 of the lever 236 engages and advances the part 138 so as to release the clutch pawl 127 for engagement with the ratchet member 125. However, actual engagement of these parts to engage the clutch does not take place at this time because the upper ear 253 having advanced the parts 138 to release the pawl 137 is now disposed in the position just behind the tail 135 of the pawl 127 still retaining it in its released position. Thus, the main clutch will not be engaged to initiate the dialing cycle of the device until the dialing key has been released and the lever 237a have been permitted to swing clockwise again to its normal position illustrated in Fig. 18 under influence of a spring 258. The importance of the fact that the clutch is merely conditioned for operation upon depression of the dialing key and engaged only upon release of said key will become apparent from the following description from which it will be seen that the downward depression of the dialing key also functions to condition other parts of the device for operation under control of the perforated tape so that it is most logical that the engagement of the clutch should be delayed until all conditions requisite to the dialing operation have been satisfied.

Referring again to Fig. 24 and also to Figs. 2 and 3, the manner in which the initial or downward movement of the dialing key 227 releases the selector dogs 35 for engagement with the paper tape to perform their dialing function in association therewith is illustrated. Upon depression of the dialing key 227, the cam surface 230 at the lower end of its stem engages the lowermost of the plates in the stack of code plates 60 which is a control plate 261, shown in Fig. 27, substantially identical with the other code plates 60 except that the edge 262 thereof is relieved throughout substantially its full length instead of carrying code notches. Thus, upon advancing of this plate toward the selector dogs, it will not interrupt their downward or advancing movement. When the control plate 261 is advanced by depression of the dialing key, it engages and moves rearwardly the sliding bars 73 which support the plate 74, the teeth 75 of which project through the latch plates 54. Thus, all of the latch plates are withdrawn from beneath the noses 55 on the selector dogs and the dogs are free to advance into contact with the code tape 10. The relationship of the latch plates 54 with the selector dogs 35 is also shown in Fig. 5. The control plate 261 also differs from the code plates in that it has a pair of upstanding guide lugs 263 embraced by slots 264 in the code plates 60 (Fig. 3).

Another function of the forward cam surface 229 on the dialing key stem 228 during the downward movement of the key is to engage and retract the dog selector plate 46 which is retaining the dogs against advancing because it underlies their forward noses 48. This is accomplished by engagement of the cam surface 229 with one of the edges 81 of the dog selector plate. Though the dialing key stem engages the selector plate 46 adjacent one edge, the plate is constrained against twisting movement by a pair of levers 265 (see Fig. 2 and Fig. 4) both fixed on a square shaft 266 supported between the side plates 78 for oscillating movement. The upper ends of the levers 265 project through openings 267 in the selector plate 46. The upper ends of the levers 265 are of cylindrical contour closely fitting the openings 267 and thus preventing twisting of the plate as it is advanced or retracted. Sidewise movement of the plate necessary during keyboard dialing is however not effected by the presence of the levers 265 because the openings 267 are of sufficient width to permit this movement.

Starting and operation by keyboard dialing

The starting of the device for dialing a number through the perforated code tape just described is accomplished by a full downward stroke of the dialing key 227. This full stroke is desirable only when the code tape is being employed and a partial stroke of the key 227 is essential to proper dialing with the dialing keys. The manner in which the key 227 is permitted a full stroke for code tape dialing but limited in its stroke when the device is operated by the dialing keys, is illustrated in Figs. 24 and 25 wherein a blocking lever 269 is shown as pivotally supported by engagement of its curved edge 270 beneath a cross-frame member 270a. An upper edge 281 of this lever is shown as underlying the shoulder 232 on the key stem 228 to prevent a full downward stroke of the key as will be required during keyboard dialing An ear 272 of the lever 269 rests on top of a plunger 273 which straddles and is guided by a pin 274 for vertical reciprocation. A lateral ear 275 on the plunger 273 engages the upper edge of a lever 276 pivotally supported on a pin 277. This lever has a nose 278 engageable by a lobe 279 on a cam 280 (see also Fig. 1) fixed to and rotatable with the same shaft that supports the advancing drum 11. The position of the lobe on the cam 280 is such that it engages the nose 278 of the lever 276 when and only when the tape is in one of its neutral positions; that is, the position in which the large openings 49 on the tape underlie the selector dogs to condition the device for operation by keyboard dialing. Thus, in the position illustrated in Fig. 24 with the lever 276 swung clockwise by the cam lobe 279, the blocking lever 269 underlies the shoulder 232 of the key 227 and limits downward depression of said key to a partial stroke so that its cam surface 229 will function to close the motor switch and engage the clutch but the downward movement of the key stem will not be sufficient to permit its cam surface 230 to engage the plate 261 and release the dogs by retraction of their latches 54. Incidentally, though the partial depression of the key stem did result in temporary retraction of the dog selector plate 46, the dogs will not have dropped or advanced because they were not released by the latch plates 54.

On the other hand when the code tape is in any of its operative positions; that is, with a perforate code registering beneath the selector dog, the lobe 279 of the cam 280 will not underlie the nose of the lever 276 and this lever, rotated counterclockwise from the position illustrated in Fig. 24, will have raised the plunger 273 and swung the blocking lever 269 out of its position beneath the shoulder 232. This permits the code tape dialing above described and also locks the device against keyboard dialing because a locking bolt 282 pivoted as at 283 to an end of the lever 276 and guided at its upper end in a suitable perforation in the plate 47, is advanced upwardly to project through an opening 284 (see Fig. 2) in the locking plate 56 to prevent sidewise movement of said plate and thus, as previously described, to prevent depression of any of the keys 45 of the dialing keyboard. During its upward locking movement the bolt 282 must pass through an opening 285 in the dog selector plate 46. This opening is sufficiently large to clear the bolt 282 and thus permit any necessary movement of the plate 46.

Referring back now to the description in connection with Fig. 2 of the drawings, it was pointed out that depression of any one of the dialing keys 51 effected lateral displacement of the selector plate 46 until the notches 50 in its edge registered beneath the dogs 35 in all of the orders corresponding to the number of the key depressed. When a multiple digit number is being dialed, it is necessary that upon depression of the first key 51 the selector dog in the first order only shall be permitted to advance, then upon depression of the next key 51 the selector dog in the second order shall be permitted to advance and so on. It is to be recalled that the dogs are held in their uppermost or retracted position not only by the selector plate underlying their forward noses 48, but also by the latch plates 54 underlying their rearward noses 55. Consequently, when the key 51 is depressed to set up the first digit in the first order, the selector dog 35 in the first order, as well as in the other orders, corresponding to the key depressed is in effect released by the selector plate but still retained in its retracted position by the presence of the latch plate 54. Thus, each time a key 51 is depressed one of the latch plates 54 must be retracted. This is accomplished through the mechanism best illustrated in Fig. 28. In this figure, one of the keys 51 is shown as having an elongated slot 290 in its stem. This slot embraces a finger 291 carried by and fixed to a shaft 292 which extends transversely of the machine. The key stems are identical in this respect and there is an identical finger 291 for each key. Consequently, depression of any one of the keys 51 imparts rotation to the shaft 292 or to a similar shaft 293. Each of the shafts 292 and 293 has a single tooth driving member 294 fixed against rotation adjacent one of its ends and the single tooth on each of said members registers in a notch 295 in a longitudinally reciprocable bar 296. The bar 296 is normally urged toward the left as viewed in Fig. 28 by a spring 297. Adjacent one end, the bar 296 engages and drives a single tooth member 298. This member is freely rotatable on one end of a square cam shaft 299 having a plurality of cams 300 thereon, one for each of the latch plates 54 as also shown in Fig. 5. Each of these cams has a lobe 301 operable upon rotation of the cam to engage in the end of a slot 302 in its latch plate 54 to retract the latch plate from beneath the noses 55 of the selector dogs. The cams 300, only one of which is illustrated in Fig. 28, are so arranged that their lobes 301 are spaced 45° radially with respect to each other and the position of the cam 300 in Fig. 28 is that which it occupies just after the cam shaft 299 has been advanced 45° so that that particular cam has retracted the latch plate 54 and again permitted it to advance. The radial spacing of the cam lobes 301 on the several cams is successively arranged so that the cam corresponding to the first order operates to retract the latch upon depression of the first key and so on toward the depression of the last key. In order that the cam shaft 299 is rotated through just 45° or enough to actuate a single latch bar 54 each time a key is depressed, the single tooth driving member 298 carries spring pawl fingers 304 (see also Fig. 5) engageable in radially spaced perforations 305 in a driving disk 306 fixed against rotation on the cam shaft 299. Thus, depression of each key 51 in setting up a number to be dialed advances the cam shaft 299 one step or 45° to effect retraction of a latch plate 54 and permit advancing of the selector dogs in proper order.

The arrangement of the selector dogs 35 is such that they move vertically and could advance by gravity. It is desirable, however, to insure positiveness and rapidity of operation, that the selector dogs be forcibly advanced at the proper time. Consequently, each of the selector dogs is, as best shown in Fig. 4, tensioned toward downward movement by a spring 307. This spring bears upwardly adjacent its ends against the edges of an inverted channel-shaped bracket 308 and engages a projection 309 on a lever 310 supported for oscillation about a transversely extending shaft 311. One such spring 307 and lever 310 is provided for each of the selector dogs 35 and the ends of the levers 310 bear against the top edges of the selector dogs. The arrangement of the projection 309 on each of the levers 310 is such that as the spring flexes downwardly its point of contact with the projection progresses away from the center 311 about which the lever pivots. Consequently, the advantage of the leverage increases as the spring approaches normal and its tension diminishes. Because of this varying leverage imposed upon the levers 310, the actual pressure on the dogs 35 is substantially constant throughout the range of flexure of the spring.

An advantage incident to the arrangement of the springs which advance the selector dogs 35 resides in the fact that they are disposed just beneath the top portion of the case of the machine where they may conveniently be viewed through a sight opening shown at 312 in Figs. 4 and 4a. Consequently, when a number has been set up and all of the selected dogs occupy their advanced positions, the positions of the springs viewed through the sight openings 312 may be observed and will serve as a means to check the numbers selected so that they may be verified before dialing if desired. Fig. 4a illustrates the sight opening in plan view and shows the portions of the springs 307 exposed therethrough. The depressed springs are indicated by dark lines showing that keys 3, 8 and 5 have been depressed.

*Starting for code key operation*

One of the code keys 61 is illustrated in its depressed position in Fig. 4 of the drawings and in this figure, as well as in Fig. 3, the lower end of the key stem 62 thereof is illustrated as having the forward cam surface 80 and the rearward cam surface 63. It will be recalled that upon depression of any one of the code keys, the cam surface 68 engages the transverse bar 64, 65, 66 or 67 on one of the code plates 60 and advances that plate until its forward or coded edge underlies the noses 48 on the selector dogs 35 so that only the dogs represented by the notched code in the edge of the code plate will be permitted to advance. Also upon depression of any one of the code keys 61, the cam surface 80 on its forward edge engages and retracts the selector plate 46 by engagement with one of the edges 81 thereon (see Fig. 2). The cam surface 80 on the code key 61, however, is of greater dimensions than the corresponding surface 229 on the dialing key shown in in Fig. 24. Consequently, the retraction of the selector plate by a code key not only removes the edge of the selector plate from beneath the noses 48 of the dogs but also retracts the selector plate a distance sufficient to engage and actuate the lever 237a which, as described in connection with Fig. 18, initiates the main clutch operation. This additional retraction of the selector plate also actuates the lever 237 which, as described in connection with Fig. 26, effects closing of the motor circuit. As previously described, advancing of any one of the code plates to its operative position beneath the noses 48 of the selector dogs results in retraction of all of the latch plates 54 through the operation of the sliding bars 73 and plate 74. Fig. 3 shows a pair of latch dogs 315 vertically slidable on the guide bar 38 for engagement with shoulders 316 on the sliding bars 73 to hold them and thus to hold all of the latch plates 54 in their retracted position. The latches 315 are urged downwardly by flat springs one of which is shown at 317 in Fig. 3. It is necessary thus to retain the latch plates 54 in their retracted position during the code key initiated dialing operation because all of the latch plates 54 are normally urged toward their latching positions beneath the noses 55 of the selector dogs. The means for urging the latch plates 54 toward their latching positions is shown in Figs. 4 and 6 as a plate 319 hingedly supported to the rear of the plates 54 by lugs 320 thereon extending through suitable perforations in the main frame cross member 91. The upper portion of the plate 319 bears against the ends of all of the latch plates 54 and springs 321 bias the plate 319 and the latch plates 54 forwardly. Through this construction, either a single one or all of the latches 54 may be retracted and will be urged forwardly with identical spring tension through the medium of the common plate 319.

*Code tape control*

Before describing the manner in which the code tape 10 shown in Fig. 1 is controlled to bring it into proper position with a perforate code registering beneath the selector dogs 35 or with one of its neutral positions represented by the openings 49 registering below the selector dogs, it should be understood that the continuous tape 10, as shown in Fig. 2, is exemplary only of one form of the invention. Another and preferred form includes a longer code tape instead of the tape 10 to enable the inclusion thereon of a greater number of perforate codes and names. The manner in which a longer tape may be employed is diagrammatically illustrated in Fig. 29 of the drawings wherein a code tape 325 is shown as passing over the rotatable drum 11 and the guide plate 15 as having its opposite ends wound upon a pair of spools 326 and 327. Torsion springs of conventional character not shown are mounted one in each of the hubs of the spools 326 and 327 which are rotatably supported on a pair of shafts 329. The springs 328 tend to rotate the spools in opposite directions and in directions to tension the tape 325. Consequently, the full length of the tape will be under tension but capable of being advanced in either direction upon rotation of the drum 11. It is contemplated too, that the tape 325 will have neutral positions; that is, series of large openings, such as those shown at 49 in Fig. 1, spaced apart throughout its length at intervals identical in length with the periphery of the drum 11 so that the drum may at any time be rotated to a certain position and in that position present a neutral portion of the tape beneath the selector dogs 35.

Figure 29:
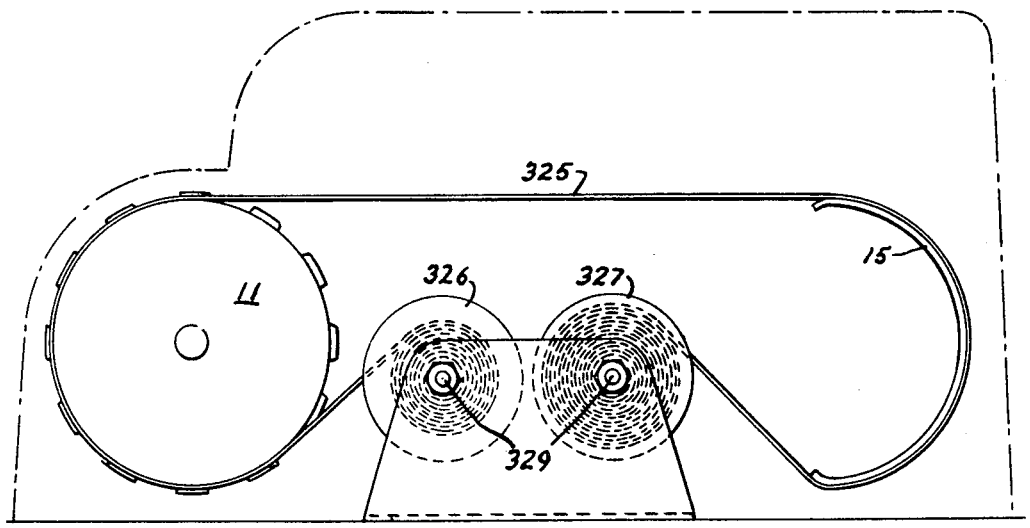
Fig. 29 is a schematic view of a modified form of code tape that may be employed instead of the kind of tape shown in Fig. 1.

In Figs. 30 to 35, inclusive, the structure employed for controlling the position of the tape advancing drum 11 is illustrated and the particular structure shown is that intended for use where the drum is employed with the longer tape wound upon the spools as illustrated in Fig. 29. Referring first to Fig. 30, the drum 11 is shown as made of a cylindrical member suitably mounted on toothed end members 331 fixed upon a supporting shaft 332 rotatable in bushings 333 disposed in the frame plates 78 of the device. The shaft 332 is adapted to be rotated in order to rotate the drum 11 and change the position of the tape and the rotating means comprises two separate hand actuated knobs 334 and 335 disposed exteriorly of the case of the device. The knob 334 is employed for rotating the tape slowly as for example when it is desired to advance it a short distance. However, when it is desired to advance the tape a great distance, such as through several letters of its alphabetical index, the larger knob 335 will be employed and is geared to the shaft 332 in a manner to effect more rapid operation thereof. The smaller knob 334 is shown as connected to a square end of the shaft and secured thereon as by a nut 336. The larger knob 335 is secured to a hub 337 rotatable with respect to the shaft 332 on a bushing 338. The hub 337 also carries a large gear 339 meshing with a small gear 340 fixed to a hub 341 which also carries a large gear 342. The hub 341 and the two gears 340 and 342 rotate as a unit about a pin 343 supported in a bracket 344 secured as shown to one of the side plates 78. The large gear 342 also meshes with a smaller gear 345 fixed on a squared portion of the shaft 332 for rotating the shaft. Consequently, the drive between the finger actuated knob 335 and the shaft 332 is geared to a ratio of say about 1 to 4 so that rotation of the knob 335 effects rapid rotation of the drum 11 and rapid advancing of the tape controlled thereby.

It is desirable to have an easily read index designating the position of the tape and for this purpose an indexed drum shown at 347 is illustrated as rotatably supported with relation to the shaft 332. The exterior of this drum bears indicia in the form of letters of the alphabet corresponding to the letters of the alphabet on the tape. It is contemplated that for the longer form of tape that a length of the tape equal to the periphery of the drum 11 will be occupied by spaces for each letter of the alphabet with the exception of x, y and z which letters will be combined into a single length. Consequently the periphery of the drum 347 will be divided into twenty-four spaces and each time that the drum 11 is moved in one direction or the other throughout a complete rotation, the uppermost letter on the drum, which may be viewed through a suitable sight opening in the case, should be moved out of view and another letter brought into view. In order to accomplish this, a twenty-four toothed gear shown at 348 (see also Fig. 34) is secured to and rotatable with the drum 347. Meshing with the twenty-four toothed gear 348 is an eight toothed gear 349 supported for free rotation on a pin 350 projecting from the side plates 78. The gear 349 is of sufficient thickness to mesh not only with gear 348, but with a single toothed segment 351 secured to the shaft 332 for rotation therewith. Thus, each time the shaft 332 has been turned through 360°, the single tooth of the segment 351 will engage and rotate the small gear 349 which in turn will rotate the gear 348 and the visible index dial 347 through one twenty-fourth part of a circle to change the indicia displayed which indicates the position of the tape alphabetically. It is necessary that the code tape be definitely located for each dialing operation with its code perforations directly beneath the selector dogs. Therefore, a detent or locating means is employed as shown in Fig. 30 and Fig. 33. This means comprises a toothed wheel 353 supported by and fixed for rotation with the shaft 332; the notches or teeth on this wheel being spaced to agree with the code positions on the tape. A detent lever 354, partially shown in Fig. 33 and also shown in Fig. 4, is resiliently urged upwardly, as by a spring 355 to engage the notched periphery of the wheel 353 compelling it to come to rest only in proper positions. The lever 354 also serves, as will later be described in detail, to engage positively with the notched periphery of the wheel 353 and prevent rotation of the tape advancing drum 11 during the time that a number is being dialed or at any time when one of the selector dogs might be extended through the code perforations in the tape. This serves to prevent splitting or tearing of the tape by attempting to advance it while a dog extends through one of its perforations. Also later to be described is a mechanism for effecting the code punching of the tape. It is desirable that this mechanism be inoperable normally and capable of operation to punch the tape only upon its being particularly conditioned for that purpose. Therefore, each time that the device performs a dialing operation followed by a resetting operation, the punching mechanism is disabled. This is accomplished by a cam 357, shown in Figs. 30 and 33, as fixed to a hub 358 rotatable with respect to the shaft 332. This hub 358 also carries a sprocket 359 (see Fig. 31) driven by a chain 360 to effect rotation of the hub 358 and the cam 357 once after each dialing operation of the device, such rotation being a function of the reset mechanism. The cam 357 bears against the tail 361 of a lever shown in Fig. 33 which is pivotally supported on a pin 362 and has a nose portion 363 engageable with the lower end of a slide member 545 to disable the tape punching mechanism in a manner that will be described under the title Code Punching Mechanism.

Another function of the hub 358, which is driven through a single complete rotation by the sprocket 359 after each dialing operation is to return the drum 11 and the code tape to a neutral position, where the large openings 49 on the tape are directly beneath the selector dogs so that the device is in readiness for operation in any one of the three manners hereinbefore described. This is accomplished by a ratchet mechanism, shown in Figs. 30 and 35, which mechanism comprises a disk 365 secured to the hub 358 and rotatable therewith. A cover plate 366, also of disk-like form, is secured to and spaced from the disk 365 and a pawl 367 is pivotally supported on a pin 368 which extends through the disk 365 and the cover plate 366. The pawl is urged inwardly as by a spring 369 toward contact with a single tooth ratchet wheel 370 fixed directly to the main shaft 332 and held in place thereon as by a nut 371. The normal position of the parts of the ratchet mechanism when the device is not in operation is that illustrated in Fig. 35 wherein the pawl is held out of engagement with the single tooth ratchet 370 by engagement of its tail with a pin 373 which is supported by and extends outwardly from one of the side plates 78. With the pawl 367 in this position, the drum 11 is free to rotate away from its neutral position in order to align any perforate code beneath the selector dogs. When the tape has been so positioned, the ratchet 370 may occupy any position other than that shown in Fig. 35 with its single tooth projecting radially outwardly at any angle. However, upon the reset operation when the chain 360 rotates the sprocket 359 and hub 358 one complete turn, the disk 365 will likewise be rotated and will carry with it the pawl 367. This movement of the pawl, counter-clockwise, as viewed in Fig. 35, will first effect removal of the tail of the pawl from the pin 373 permitting it to move under influence of its spring 369 into engagement with the periphery of the single tooth ratchet 370. Therefore, during this single complete rotation, the pawl 367 will engage the single tooth of the ratchet wheel 370 in whatever position it may have been left and will, through this engagement, rotate the ratchet wheel 370 to the neutral position illustrated in Fig. 35. Furthermore, at the end of its single turn, the pawl 367 will again come into engagement with the pin 373 releasing it from the ratchet wheel and once more enabling adjustment of the drum 11 and the code tape manually as previously described.

*Reset mechanism*

After each dialing operation of the machine, reset mechanism under control of the reset clutch operates to restore all parts of the machine to their original or starting positions. Generally speaking, the reset operation may take place automatically after each dialing operation of the device. However, in some instances it may be desirable to have the reset operation dependent upon manual control. The description will proceed first on the assumption, however, that resetting takes place automatically at all times.

The function of the reset mechanism is first to restore all of the selector dogs to their retracted or uppermost positions and then to reset the outer barrel or order control barrel to its normal starting position. The reset mechanism operates also to restore the trip lever for the reset clutch to condition the clutch for its next operation. Opening of the main switch to the motor is a function of the reset mechanism and the cam shaft which controls the selection of orders from one to seven successively when the selector keys are punched is reset to its normal position. In the event that a code key has been employed for dialing, the reset operation restores the selected code plate to its normal position. Reset also returns the perforate code tape to a neutral position and effects disabling or inactivating of the punching device in the event that it has been used just prior to the last dialing operation. The manner in which these several reset functions are accomplished is now to be described in the order in which the functions are mentioned hereinabove.

The selector dogs 35 are all supported for their advancing movement on the common support and guide bar 38 as shown in Figs. 3 and 4. After a dialing operation, this bar under control of the reset mechanism is raised, thus lifting all of the selector dogs until the noses 55 on their rear edges snap past the spring pressed latch plates 54 and the noses 48 on their forward edges snap past the forward edge of the spring pressed dog selector plate 46. To raise the bar 38 for restoring the dogs to their retracted positions, a pair of cams 390 (see Figs. 36 and 37) are carried on a sleeve 391 supported on and rotatable with respect to the reset shaft 113 which, as will be recalled, is turned through a single revolution each time the reset clutch is engaged. The sleeve 391 also carries a gear 392 fixed to it and disposed adjacent to a gear 393 of identical pitch and diameter secured to the reset shaft. A coupling gear 394 (see also Fig. 28) rotatably supported on a pin 395 and which also serves a further function later to be described, normally meshes with both of the gears 392 and 393 in order to connect the reset shaft and sleeve 391 for simultaneous operation. Consequently, for each revolution of the reset shaft, the cams 390 revolve and raise a pair of levers 396 (Fig. 37) which underlie the bar 38 in order to raise it. The levers 396 are pivotally supported by reason of tail portions 397 thereon extending through slots in the transverse bar 91 which extends between the main frame plates 78. Immediately ensuing the restoration of the dogs to their normal position, the bar 38 is urged toward its normal lowered position by means of a pair of springs one of which is indicated at 398 in Fig. 37.

After each dialing operation of the device, the outer or order control barrel 39 must be restored to its original or starting position. Incidentally, while there are times when all reset functions are not desirable after a dialing operation, such for example, as where it is desired to hold or retain a certain number for repeated dialing, the restoration of the outer or order control barrel is necessary after every dialing operation. To effect this restoration, the gear 393 (Fig. 36) fixed directly to the reset shaft 113 meshes with a gear 400 rotatable on the main shaft 25 through an anti-friction bearing bushing 401 (see also Fig. 21) and this gear 400 has fixed to it a spacer plate 402 which carries a laterally projecting pin 403 which extends into an arcuate groove 405 in the disk 196 previously described as forming a part of the outer barrel control mechanism. The normal position of the pin 403 with respect to the groove 405 is that shown in dotted lines in Fig. 21 wherein the pin bears against one end of the groove. As the outer barrel progresses from order to order during the dialing operation moving counter-clockwise as viewed in Fig. 1, a space is created between the pin 403 and the end of the groove 405. The pin 403 has, of course, remained stationary during the dialing operation. Thus, upon rotation of the reset shaft 113, the gear 400 will also be rotated through a single complete cycle and the pin 403 revolving with the gear will advance until it picks up the end of the groove 405 and carries it to the normal position illustrated in Fig. 21.

The reset mechanism, in operating, functions to limit itself to a single cycle and in so doing also to reestablish the normal position of its trip mechanism so that engagement of the reset clutch will again take place at the end of the next succeeding dialing operation. This is accomplished by the structure shown in Fig. 16 wherein the Geneva wheel 183, which is fixed to and serves to advance the outer barrel, will rotate upon resetting of the outer barrel in a counter-clockwise direction. During this rotation any one of the teeth of the Geneva wheel will act as a cam to engage the pin 214, which during the reset cycle is in the notch 220, depressing the pin and the lever 208 so that the pin will again become engaged on the shoulder 219 of the control plate 215. The control plate 215 meanwhile having been urged in a counter-clockwise direction because of its frictional engagement with the Geneva wheel. When the lever 208 is depressed in this manner, its bifurcated end engages the pin 210 and rocks the clutch release finger 224 to the position illustrated in Fig. 16 where it engages the tail 162 of the reset clutch pawl disengaging the clutch and holding it in readiness for further engagement upon the next successive operation of the release finger 224.

Breaking the circuit to the motor by separating the switch contacts 242 and 243, shown in Fig. 26, must also take place after each dialing operation of the device and is accomplished by rotation of the reset shaft. In order to close this switch it will be recalled that the lever 241 has been retracted or moved toward the right as viewed in 226 so that it will have swung upwardly under the tension of its spring 250 and its ear 249 will be blocked or latched by the end of the latch lever 248. This latch lever is pivoted as on a pin 408 and is normally urged downwardly by a spring shown at 409. A cam 410 fixed to the reset shaft 113, as also shown in Fig. 36, has a relieved portion normally receiving a nose 411 on the lever 248. The reset shaft and cam 410 operate through a full cycle in a counter-clockwise direction so that upon the initial portion of this cycle, the cam effects raising of the lever 248 about its pivotal support to release the blocked main switch control member 241 and by so doing, permit that member to move toward the left under influence of its spring 250. At the completion of the cycle of the reset shaft 113, the lever 248 is depressed by its spring 409 coming to rest in the relieved portion of the cam 410 and again assuming that position shown in Fig. 26. Upon this downward swinging movement of the lever 248, its extreme end strikes on top of the ear 249 of the member 241 depressing the switch control member and thus effecting separation of the switch contact 243 from the contact 242 and breaking the circuit to the motor.

The reset cycle restores the cam shaft 299, the cams 300 of which control the order in which the selector dogs are permitted to advance through the mechanism shown in Figs. 38 and 39. The cam shaft 299 carries a rotatable bushing 415 to which is fixed a gear 416 connected with the gear 393 on the reset shaft 113 to be driven thereby through the medium of the gear 394 described in connection with Fig. 35. Fixed to the cam shaft 299 for rotation therewith is a disk 417 with a lug 418 projecting laterally from its face into the path of a lug 419 projecting from the face of the gear 416. The normal position of the lugs 418 and 419 is that illustrated in Fig. 39 wherein they are shown in contact with each other. However, upon operation of the cam shaft 299 during setting up of the selector dogs for dialing by a dialing key operation, the shaft and its attached disk 417 rotate counter-clockwise as viewed in Fig. 39 so that the lug 418 moves step by step away from the lug 419 on the gear 416. Thus, whatever the position of the lug 418 may be at the completion of a dialing operation, the reset cycle will advance the gear 416 clockwise a single complete revolution so that its lug 419 will engage and restore the lug on the plate 417 to its normal position. This, of course, returns all of the cams 300 on the cam shaft to their normal position so that upon the next initial operation of the cam shaft the first cam thereon functions to release the selector dogs in the first order.

Under operation of the dialing device by a code key, one of the code plates 60, shown in Fig. 3, is advanced into its operative position with respect to the selector dogs 35 and it is a function of the reset mechanism to restore this plate 60 to its position in the stack after the dialing operation is complete. This is accomplished as may best be understood by reference to Figs. 3 and 4. It should be recalled first that when the code plate 60 was advanced, its ears 72 engaged and urged the sliding bars 73 rearwardly in order, through the plate 74, to retract all of the latches 54. The sliding bars 73 with the plate 74 are latched in their retracted position by the previously described spring pressed latch dogs 315. At the same time, however, the plate 319 engaging the ends of all of the latches 54 is tending to urge this entire assembly forwardly under influence of the springs 321. Thus, upon reset operation, the common support and guide bar 38, which is raised to restore all of the dogs 35 to their normal position, also raises the latch dogs 315 and in so doing, releases the sliding bars 73 to return to their normal position and, through their ends engaging with the ears 72 on the advanced code plate 60, to return such code plate to its position in the stack.

At the completion of any dialing operation that involves use of the code tape, it is desirable that the tape be returned to one of its neutral positions automatically in order that the machine will be in readiness for immediate operation either by the dialing keys or by a code key or for another operation under control of the code tape. The manner in which the tape is returned to a neutral position has been described under the title Code Tape Control and with reference to Figs. 30, 31 and 35 wherein the chain 360 was described as driving the sprocket 359 and returning the shaft 332 to a normal position through the pawl 367 and single tooth ratchet 370. The chain 360, which effects this driving, is itself driven directly from the reset shaft 113 as shown in Fig. 40 as the reset shaft 113 turns through a single complete rotation for each reset operation. A sprocket 422 secured to the reset shaft is identical in size with the driven sprocket 359 on the shaft 332. Thus, each reset operation is accompanied by a single complete rotation of the sprocket 359 and through the mechanism illustrated in Fig. 35 effects return of the drum 11 and the code tape driven thereby to a neutral position. The chain 360, as shown in Fig. 40, is guided over a plurality of idler sprockets 423 to avoid contact with other parts of the device not illustrated in this figure of the drawing.

The inactivating of the punching device during the reset operation which is effected by the cam 357 in Fig. 33 and by the lever 361—363 will be readily apparent upon an understanding of the punching device, a description of which will shortly be set forth.

The resetting operation has just been described as taking place automatically after every dialing operation of the device. It is desirable in some cases, however, that the resetting be actuated manually rather than automatically. For example, when a number has been set up for dialing by depression of the dialing keys, it may happen that the circuit represented by that number is busy so that it will become necessary within a few moments time to re-dial the same number. It is desirable therefore, that the reset operation does not take place automatically insofar as restoring the selector dogs to their normal position or retracting the latches 54. This will enable a second dialing of the number simply by closing the motor switch without the necessity of again depressing all of the dialing keys necessary to set up the number. The reset clutch and the main reset shaft driven by it should, however, function automatically even in such cases because it is essential that the outer barrel be restored to its original or starting position and it is necessary that the reset mechanism perform its function of disengaging the main switch to the motor. In order to prevent automatic resetting of the selector dogs and automatic restoring of the shaft which retracts the latches 54, the small gear 394 (Fig. 39), is supported in such a manner that it may be removed from its engagement with the gear 416 controlling the cam shaft 299 and also removed from its engagement with the gears 392 and 393 which it ordinarily couples together, the gear 392 being the one which drives the sleeve 391 (Fig. 36) which restores the selector dogs to their normal positions. The pin 395 which carries the small gear 394 is therefore carried on a lever plate 430, shown in Figs. 26 and 28, as mounted for rocking movement on the bushing 415 on the end of the shaft 299 (Fig. 38) and as controlled by a pin 431 carried by a lever 432 and engageable in a slot 433 formed in the edge of the lever plate itself. A spring 434 associated with the lever 432 normally holds it in its uppermost position illustrated in Fig. 26 wherein the pin 431 has rocked the lever plate 430 in a clockwise direction and to a position that disassociates the gear 394 carried thereby from its position of operation shown in Fig. 39. The operative position of the gear 394 is that shown in Fig. 28 wherein a latch 436 tensioned by a spring 437 engages a latch shoulder 438 on the lever plate 430 to prevent its swinging to its inoperative position under influence of the pin 431. The latched position shown in Fig. 28 represents the normal position of the parts before any dialing operation and will result in a complete reset operation as previously described. However, should an operation be initiated by depressing one of the dialing keys to start setting up a number to be dialed, the first key depressed through its associated lever 291 rocks the square shafts 292 and 293 which are coupled together through their connection with the bar 296. Thus, no matter which dialing key is depressed, the square shaft 293 will be rotated and this shaft carries a single tooth driving member 440 engageable with a sliding bar 441 to move that bar to the right as viewed in Fig. 28 where it engages the tail 442 of the latch 436 releasing the latch from its engagement with the lever plate 430 which then swings to its inoperative position so that the gear 394 will not, during the reset operation, cause restoration of the selector dogs or retraction of the latch plates 54. Now any number that has been set up for dialing by depression of the dialing keys remains set up and can be redialed simply by closing the switch to the motor. The operation just described is one creating a condition where a selector dog or several selector dogs may be left in their advanced position projecting through the code tape at one of its neutral positions. Another illustration of where this condition could occur is that of an interrupted operation where an operator, for example, has depressed only one or two of the dialing keys and is then called away from the telephone. In these events or in any event where a selector dog has been left projecting through the code tape, it could be possible to adjust the position of the code tape and in so doing to tear the tape by its engagement with the advanced selector dogs. Such accidental operation is prevented as an incident to the depression of any dialing key through the mechanism just described which releases the lever plate 430 to swing in a counter-clockwise direction as viewed in Fig. 26 or clockwise as viewed in Fig. 28. This lever plate 430 engages a dogging lever 445 pivotally supported as at 446 having its upper end engaged, as shown, in a notch formed in the lever plate 430, and having its lower end overlying the inclined end 447 of the lever 354 which, as shown in Figs. 26 and 33, engages the toothed wheel 353 ordinarily employed for positively locating the code tape. When the dogging lever 445 is swung over the inclined end 447 of the lever 354, the lever 354 is locked in engagement with the notched wheel 353 thus positively to prevent rotation thereof and advancing movement of the code tape after any dialing key has been depressed, and this condition will remain until a subsequent manual reset operation takes place.

When it is desired deliberately to restore all of the parts of the device by a complete reset operation after a number has been set up by depression of the dialing keys, a manual reset key 450, shown in Fig. 26, must be depressed. This key is carried on the upper end of an elongated key stem 451, depression of which performs several functions. First, a shoulder on the stem 451 engages an end of the lever 432 pressing it downwardly against the tension of its spring 434. This first restores the lever plate 430 to its normal position in which it is retained by the latch 436, thus reestablishing the two driving connections of the gear 394 carried by the lever plate. As the key stem 451 moves downwardly, it also engages the end of the main switch control member 241 through a cam edge 452 moving the switch control member to the right to effect engagement of the switch contacts 242 and 243 and energization of the motor. Also during its downward movement, the key stem 451 effects engagement between a notch 454 adjacent its lower end with a tail 455 on a lever 456. This lever 456 is carried for free rotation on the extended end of shaft 174 associated with the reset clutch engaging mechanism shown in Figs. 16 and 17. Now the key stem 451 having been fully depressed, the lever plate 430 has been restored and the motor has been energized. When the key 450 is released, the key stem 451 is urged upwardly by spring 409 one end of which is anchored thereto and it is only upon its upward movement that the notch 454 effects counter-clockwise rocking movement of the lever 456. This lever, during this movement engages a pin 457 on a lever 458 carried at one end of a tubular shaft 459 (Fig. 41) which surrounds the shaft 174 and extends transversely of the device where at its other end it carries a lever 460. The lever 460 is engageable with pin 210, as shown in Fig. 41, and the pin 210, by being moved toward the left (see Fig. 16) will, as previously described, effect tripping or engaging of the reset clutch. A complete reset operation therefore ensues. Incidentally, the rocking of the lever plate 430 which results from depression of the manual reset key 450 also returns the dogging lever 445 to its normal position where it no longer obstructs the lever 354 and therefore frees the code tape for operation.

It may be desired to require manual clearing or manual resetting of the device after all dialing operations whether they be initiated by dialing keys, by code key or by the perforate code tape. Such operation can readily be accomplished with the structure herein described simply by providing a lever 463 (see Fig. 28) pivotally supported on a rounded end of the square shaft 292. The lever 463 has an upper end engageable with the bar 441 and its lower end projects to a position for engagement, as best shown in Fig. 26, by lever 237 which is the switch control lever movable to the right, as illustrated in Fig. 26, upon any dialing operation of the device. Consequently, when a number is dialed in any of the several manners possible, the lever 237 moves toward the right, engages the lever 463 and through the same effects movement of bar 441 to prevent a full reset operation as previously described.

*Telephone dial actuation*

The device of the present invention is disclosed herein in its application to a standard commercial telephone instrument and as having the function of imparting dialing movement to the dial or finger plate of the instrument. The result of this dialing action is, of course, only to actuate a conventional impulse device which opens and closes a switch within the telephone for sending electrical impulses as is well known. It is readily understood, therefore, that the telephone instrument itself could be eliminated and the conventional impulse mechanism contained by it could be included as a part of the dialing device as for example, by connection directly with the clutch controlled shaft 25. As the number of standard telephone instruments in existence is very great, the desirability of a device adapted for use with such an instrument is recognized and therefore the present invention includes the means now to be described for making a suitable connection between the dialing device and a standard telephone.

The mechanism to be desccribed is one wherein the telephone is positioned closely adjacent to the dialing device and as a matter of fact resting upon a common support so that its position is relatively fixed with relation to the dialer. However, a more remote position of the telephone instrument is also contemplated and as the only actual operating connection between the dialer and the telephone instrument is in the form of a flexible cord or cable, it will also be understood that a conventional sheathed cable could be used in place of the cord and pulley arrangement herein shown and that with such an arrangement the position of the telephone relative to the dialing device would become unimportant. Several factors that pertain to the protection of the telephone instrument itself, as well as protection of the dialer and freedom and ease of its operation, have been taken into consideration in making the connection herein illustrated between the dialing device and the telephone instrument.

For example, the invention includes a dial similar in construction and appearance to a standard telephone dial adapted to be superimposed upon or to overlie the dial on the telephone instrument. The term "dial" as used herein is employed in reference to that perforate disk referred to in the telephone industry as the finger plate employed in dialing a telephone number. In the present construction, the auxiliary dial or finger plate may be used to effect dialing of a telephone in the conventional manner and care has been taken in the design of the connections between this finger plate and the finger plate of the telephone instrument to avoid any damage or abuse of the instrument as well as to avoid damage or abuse of the dialing device itself.

The manner in which these safeguards are attained will become apparent from an understanding of this structure disclosed in Figs. 48, 49 and 50. In these figures, a supporting case 465 is illustrated as having pivotal bearings 466 by means of which it is supported in the relationship shown in Fig. 52 on a base portion 467 which is an extension of the base upon which the dialing device is supported and which also carries the telephone instrument illustrated at 468. Through its pivotal connection, the case 465 is adapted to swing to a normal operating position with a false or auxiliary finger plate 470 overlying the finger plate 471 (see Fig. 49) of the conventional telephone instrument 468. The case 465 carries a shaft 473 journaled for rotation in a bearing 474 and also supported in a bearing 475 held in a plate 476 which, as best illustrated in Fig. 50 extends transversely of the case 465. A pulley 478 is mounted on the shaft 473 to rotate freely thereon and to this pulley, which is comparable to the pulley diagrammatically shown at 20 in Fig. 1, is secured the cable 21. The guide pulley 22, also shown diagrammatically in Fig. 1, is supported within the case 465 on a shaft 480 which extends through an arcuate slot 481 in the case 465 and is adjustably secured therein as by a knurled nut 482. The shaft 480 is, in fact, carried by a lever 483 pivoted as at 484 to permit adjustment of the pulley for properly tensioning the cable 21. The further guiding of the cable 21, as by passing it over pulleys like the one diagrammatically illustrated at 23 in Fig. 1, may be such as convenience and the particular shape of the housing and supports may require it being understood that the other end of the cable is anchored to the pulley 24 and actuated by the dialer. Therefore, upon operation of the dialer in the manner previously described, the pulley 478 is rotated counter-clockwise, as viewed in Fig. 50, a distance depending upon the particular digit being dialed. During this rotation, a pin 486 carried by the pulley engages a finger 487 secured to the shaft 473 to impart rotation to the shaft. Also secured to the shaft adjacent its end and held thereon as by a nut 488 is a disk 490 carrying a rubber covered dialing finger 491 comparable to the finger illustrated at 18 in Fig. 1 and adapted to extend into one of the openings of the finger plate of the telephone instrument.

The phase position of the dialing finger is shown at its normal rest position in Fig. 50 but as displaced in Fig. 49 in order better to illustrate its relationship to the telephone instrument. Therefore, upon actuation of the dialing device, the pin 46 in effect drives the finger plate of the telephone instrument positively in one direction but upon return movement permits the finger plate of the telephone instrument to return under control of its own spring mechanism and governor so that no forced return and consequent harm to the telephone instrument is possible. The pulley 478 is tensioned toward return to its normal position by a torsion spring 493 interposed between the bearing 474 and the pulley itself and to insure that the cord is taut at all times. A stop to prevent reverse rotation of the disk 490 beyond its normal rest position may be provided, as shown in Fig. 50, by a pair of engaging lugs 494 and 495, the former being punched and bent from the plate 476 and the latter from the disk itself. The auxiliary finger plate 470 is also supported for rotation relative to the shaft 473 and is tensioned toward its normal rest position by a torsion spring 479. Stop lugs 498 and 499 similar to those shown at 494 and 495 limit the return of the finger plate 470 to its normal position which is that shown in Fig. 48.

When it is desired to dial a number without employing the dialing device, the auxiliary plate 470 may be employed in the same manner as the conventional telephone finger plate or if desired, the entire support 465 may be swung backwardly to expose the telephone dial which then may be used in a conventional manner. Because of the fact that the pivotal bearings 466 are arranged coaxially with the cable 21 where it enters the case, as shown in Fig. 48, through the center of one of said bearings, the case 465 may be swung out of contact with the telephone as just described without disturbing the position or tension of the cord 21.

Upon rotation of the auxiliary finger plate 470 to effect the dialing of a number, a pin 500 on said plate engages a lever 501 secured against rotation on the shaft 473 and held in place as by a nut 502. When the plate 470 is rotated, the pin engages the lever 501 and rotates the shaft to which the disk 490 is also secured and the same motion imparted to the auxiliary plate 470 is thus imparted through the finger 391 to the telephone finger plate 471. Because of the single direction driving connection between the pin 500 and the lever 501, it is impossible to force return movement of the telephone finger plate 471 and thus the telephone is protected against any forcing movement which opposes its own governor mechanism. Furthermore, rotation of the auxiliary finger plate 470 does not rotate the pulley 478 which is free on the shaft 473 and therefore does not disturb the dialing device to which the pulley is connected as by the cord 21. The dialing device is similarly protected in the event that anyone should swing the case 465 away from the telephone and manipulate the finger 491 manually because the disk 490 rotates the shaft 473 but the pulley 478 is free on said shaft. It may be desirable to observe a dialing operation that is being accomplished automatically by the dialer and for this purpose, a transparent cover of plastic or similar material shown at 505 is employed to cover the central part of the auxiliary finger plate 470 and to enclose the lever 501. Reference numbers are then radially arranged on the face of the disk for association with the lever 501 which acts as a pointer and upon operation of the dialing device, rotation of the disk 490 and dialing finger 491 is transmitted through the shaft 473 to the lever 501 which rotates clockwise as viewed in Fig. 48 and the number being dialed may be discerned by observing the movement of the lever 501 with relation to the reference numbers.

It is undesirable, as previously explained, that the return movement of the finger plate on the telephone instrument be forced against the tendency of the instrument governor to control its speed. Therefore, in order to prevent too rapid return of the disk 490 and finger 491 under the influence of the spring 493 as well as to prevent too rapid return movement of any of the parts of the dialing device, a governor may be provided as shown in Fig. 51. In this figure, the main driven shaft 25 is illustrated with the pulley 24 shown in dotted lines secured adjacent its end and with a worm wheel 507 mounted for rotation thereon. The worm wheel is provided with spaced perforations 508 arranged in a circle concentric with the shaft 25 and engageable by the ends of ratchet springs 509 carried on the side of the pulley 24 during reverse or return movement of the pulley only. During this return movement, therefore, the worm wheel 507 is rotated and drives a worm 511 mounted on and driving a governor shaft 511a which carries flyweights 510 operating in a cup 512 in the manner of a brake to control the speed of the pulley 24 by conventional governor action.

Code punching mechanism

As the dialing device of the present invention provides for dialing telephone numbers through the medium of perforate codes in a tape-like member, it is desirable that some means be included for forming the required perforations while the tape is in place in the device. Through such means, the device distinguishes from presently known automatic dialers wherein any code means employed must be removed from its operative position usually by a skilled mechanic and most often must be returned to the manufacturer of the dialer to be recoded or replaced when a different number is required.

The device of the present invention is adapted to be sold to any telephone subscriber with the code tape 10 in blank form and the subscriber can place names and perforate codes thereon in any desired number with the expenditure of no more than a few seconds time for making each new entry.

The code punching mechanism is supported on a sliding carriage 515 shown in Figs. 42 to 47, inclusive, and also shown in Figs. 4 and 5 as slidably mounted transversely of the dialer in notches formed adjacent the upper edges of the side plates 78. The top of the slidable carriage 515 is disposed directly beneath the code tape at a position between the tape advancing drum 11 and the selector dogs 35. The carriage 515 supports a pair of spaced vertical bearing plates 516 and 517 which in turn support a transversely disposed upper guide plate 518 and a similarly disposed lower guide plate 519. Seven identical punches 520 are disposed for vertical sliding movement between the plates 518 and 519. These punches, as shown in Fig. 44, have reduced upper and lower ends 521 and 522 guided in suitable guide slots in the plates 518 and 519. The lower end 522 of each punch cooperates upon descending with a complementary die opening 523 formed in the carriage 515 and, as the code is disposed above the carriage 515 and below the guide plate 519, descending of any one of the punches will effect perforation of the tape. Each punch has an elongated opening 524 and an operating lug 525, the latter preferably being made by partially punching and deforming a part of the material of which the punch is formed. A square shaft 526 extends through the openings 524 of all the punches and is rounded at one end for rotatable reception in the bearing plate 516. The opposite end of the shaft 526 has a cylindrical bushing 527 pressed thereover with a flange 528 at one end. The bushing 527 is rotatably and slidably carried in a bearing member 529 suitably secured in the bearing plate 517.

In operation, each of the seven punches 520 corresponds to one of the orders in a telephone number so that in coding a number by perforating the tape, the carriage 515 is first adjusted to the left or right to a position corresponding to the code position on the tape of the first digit in the first order. The first punch, that is the one on the left, is then depressed to perforate the tape. The carriage is then again shifted to correspond in position to the digit in the second order of the telephone number and the second punch is then depressed and the same sequence is followed throughout the remaining orders.

The punches 520 are actuated by cams 530 there being one such cam for each punch mounted on the square shaft 526 and positioned alongside the punch for engagement with the actuating lug 525 thereof. A similar cam 531, also carried by the shaft, occupies a position adjacent the bearing plate 516 and acts as a stop member by engaging a lug 532 bent from said plate. The square shaft 526 with its cams is normally held in a neutral or inoperative position by a torsion spring 533 encircling the bushing 527 and anchored at one end in the flange 528 and at the opposite end in the bearing member 529. The punch actuating cams 530 are profiled as shown in Fig. 44 each with a rise 534 adapted upon rotation of the shaft to engage the lug 525 and depress the punch against the tension of a spring 535 disposed between the punch and the bottom guide plate 519 and normally tending to hold the punch in its raised position. The neutral position of the leftmost or first order cam is that shown in Fig. 44 with the rise 534 disposed against the lug 525 in readiness for depressing the key upon the initial counter-clockwise movement of the shaft 526. Each of the other cams 530 is normally positioned with its rise 534 displaced 45° in a clockwise direction with respect to the cam next preceding it so that upon a complete rotation of the shaft each of the punches will have been depressed one at a time in succession.

Rotation is imparted to the square shaft 526 by a lever 539 (see Figs. 45 and 47) with a finger pad 540 at its end so that it may conveniently be depressed. The lever is freely journaled on the bearing member 529 (see Fig. 42) and has a pawl finger 541 standing outwardly from one of its sides for engagement with the teeth of an eight tooth ratchet wheel 542 carried by the square shaft 526 at a point beyond the outer terminus of the bushing 527 thereon so that rotation of the ratchet wheel 542 imparts rotation to the shaft. A spring 543 biases the lever 539 toward its normal or upward position shown in Fig. 47 and as the lever has an elongated opening 544 where it embraces the bearing member 529, this spring also serves to hold the lever downwardly or with its pawl finger 541 in engagement with the ratchet teeth of the wheel 542. However, when the lever 539 is depressed through an angle of 45° to its lowermost position, as shown in Fig. 45, to effect a single punching operation through one of the cams 525, it will be returned by the spring 543 to its normal position and in returning, the elongated opening 544 permits movement of the lever in the direction of its own length sufficiently for the pawl finger 541 to override a ratchet tooth and come to rest behind the next ratchet tooth in readiness for the next punching operation. When a complete telephone number has been punched, the torsion spring 533 has been loaded and stands ready to return the shaft 526 to its normal position with the cam 531 in engagement with the stop lug 532. This is accomplished by shifting the entire shaft 526 toward the right, as viewed in Fig. 42, to clear the cams 530 from the lugs 525 and also to clear the ratchet wheel 542 carried by the shaft from the pawl finger 541 on the lever 539. In this connection the torsion spring 533 also serves as a compression spring normally tending to urge the shaft 526 toward the left or into its operative position.

Figure 52:
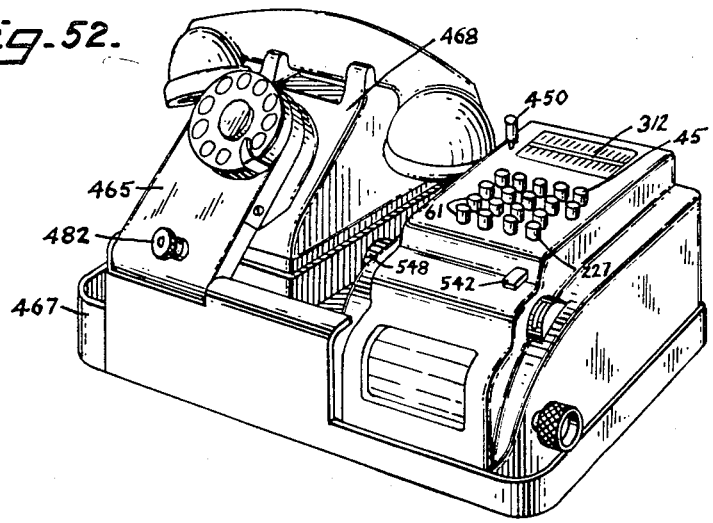
Fig. 52 is a perspective view of a completely assembled device embodying the present invention.

In order to move the shaft 526 to inoperative position, a cam slide 545 is guided for vertical sliding movement through the guide plates 518 and 519 and has an inclined cam surface thereon engageable with the rounded end of the shaft 526 to move it toward the right when the cam slide is moved upwardly. In the uppermost position of the cam slide, the end of the shaft rides on a flat 547 so that the shaft is held in its normal or inoperative position. This position of the shaft is assumed throughout all of the dialing operations of the machine so that it is at no time possible accidentally to depress the lever 539 and effect punching of the code tape. Each time that a telephone number is to be coded on the tape by punching, the cam slide 545 must be depressed to occupy the position shown in Fig. 42. For this reason, the upper end 548 of the cam slide preferably extends through the casing of the machine for convenient operation by a person's finger as indicated in Fig. 52. Incidentally, should the cam slide 545 be accidentally depressed, any normal dialing operation of the device followed by a clearing or reset operation or any reset operation itself will automatically, as has been described, effect upward movement of the cam slide 545 so that the punching mechanism is returned to its normal inoperative position.

Adjustment of the sliding carriage 515 to left or right for the purpose of positioning the punches to correspond to the separate digits in the several orders of the telephone number is accomplished by a hand wheel 549 (see Fig. 46) a portion of which will project through the machine casing for engagement by the finger in order that it may be rotated. The wheel 549 is peripherally indexed in the manner of a telephone dial and is carried on a hub 550 rotatable on a stud, shown in dotted lines at 551, projecting outwardly from one of the main side plates 78 of the device. The hub 550 carries a cylindrical cam 552 with a stepped edge 553 engageable with a pin 554 (see also Fig. 42) depending from the sliding carriage 515. A spring 555 secured to the side plate 78 engages an end shoulder on the carriage 515 urging it toward the right to hold the pin 554 in engagement with the cam edge 553. Thus, rotation of the hand wheel 549 and the cam 552 controlled by it, will effect lateral adjustment of the carriage 515 to the various code positions of the punches carried by it as indicated by the indicia on the wheel 549.

Thus, a complete punching operation consists of the following steps. First, depression of the cam slide 545 to enable the punches to be operated, then adjustment of the hand wheel 549 to the digit of the first order of a number to be punched. Depression of the lever 539 effects the punching in the first order and upon a second adjustment of the wheel 549 for the second order the lever 539 is again depressed and so on until the number is completely coded by perforations in the tape.

It is possible that a person perforating a number in the tape may, after the third or fourth order is punched, fail to recall which order was last punched. An indicator dial 556 (Fig. 42) is therefore preferably secured to an end of the shaft 526 to project outwardly of the casing or in a position to be viewed through a suitable sight opening in the casing. The periphery of this drum may be marked 1st pos., 2nd pos., etc. at 45° spacings and the drum will thus serve to indicate angular displacement of the shaft 526 and consequently the number of the punch 520 last actuated. A pan 557 is disposed beneath the carriage 515 to receive the paper slugs resulting from the punching operations.

The code punching mechanism is, as just described and as shown in Fig. 4, disposed between the selector dogs and the exposed or readable part of the tape where it passes over the drum 11 beneath a window 560. Therefore, the punching operation takes place at a position displaced with relation to the selector mechanism. In order to correlate these positions in a convenient manner, the spaces on the tape 10 are numbered as indicated in Fig. 1. That is they are serially numbered at both edges of the tape with the series of the right edge displaced with the series of the left edge a distance corresponding to the distance between the selector mechanism and the punching mechanism. Therefore, in order to punch code perforation in the correct area on the tape the name of the subscriber is first entered in its proper position and the left edge number is noted. The tape is then adjusted until the corresponding number on the right edge appears in the position where the name has been entered and the space to be punched will have been aligned beneath the punching mechanism. For example, Fig. 1 shows the subscriber's name, Richard Roe, entered on the tape in the position to be viewed and in the space numbered 55 at the left. The punched code for Richard Roe underlies the selector dogs 35 in space 39 at the left. The punching of this code, however, took place, not in the position shown, but when the tape had been adjusted in a counter-clockwise direction until the space numbered 55 on the right hand edge occupied the position to be viewed. This adjustment of the tape moved the space beneath the selector dogs to a position beneath the code punching mechanism.

The control mechanism of this invention has been disclosed herein in association with a telephone dialer for purposes of clearly illustrating its structure and operation. Its use is not limited however to this association as it will function to produce controlled intermittent rotary motion for various purposes.

I claim:

1. In a device for imparting dialing movements to a telephone or the like which includes groups of selector dogs advanceable to control clutch mechanism for determining numbers to be dialed, plate-like members adapted to be selectively positioned adjacent the dogs to obstruct their advancing movement, openings in said plate-like members to permit advancing movement therethrough of selected dogs in said groups representing a telephone number, a key for each plate-like member, and means effective upon depression of any one of said keys to position the corresponding plate-like member for control of the dogs.

2. In a device for imparting dialing movement to a telephone or the like which includes groups of aligned selector dogs advanceable to control clutch mechanism for determining numbers to be dialed, a stack of code plates adapted to be positioned adjacent the dogs to obstruct their advancing movement, each code plate having openings therein to permit advancing movement therethrough of selector dogs representing a telephone number, keys having stems arranged to advance through the stack of plates and means on each plate engageable by one only of the key stems to position the plate for control of the dogs upon depression of is associated key.

3. In a device for imparting dialing movement to a telephone or the like which includes groups of selector dogs advanceable to control clutch mechanism for determining numbers to be dialed, a plate adapted to obstruct the operation of the dogs, said plate having openings to permit advancing of one dog in each group to represent the digits in the several orders of a number to be dialed, numbered depressible keys, and means effective upon the depression of any key to adjust the plate for advancing of the dogs corresponding to the numbers of the key depressed.

4. In a device for imparting dialing movement to a telephone or the like which comprises selector dogs arranged in groups representing the orders of a telephone number with the dogs in each group representing the digits for each order and the dogs being advanceable to control clutch mechanism for determining numbers to be dialed, a plate adapted to obstruct operation of the dogs but having openings to permit advancing of one dog in each group, numbered keys, means effective upon depression of any key to move the plate for release of the dog corresponding to the number of the key depressed in all groups, means normally preventing advancing of all the dogs and means operable upon depression of successive keys to progressively disable said preventing means for one group of dogs at a time.

5. In a device operable through rotary motion to effect sending of electric impulses in numbers corresponding to magnitude of angularity of the rotary motion, a normally engaged clutch controlling the rotary motion, a clutch disengaging member rotating with the clutch, means including a barrel rotatable with the engaged clutch and acting upon being interrupted to actuate said member to disengage the clutch, said barrel having perforations spaced angularly and longitudinally with respect to its axis, a plurality of dogs selectively advanceable to engage the barrel for entrance into said perforations to effect disengagement of the clutch and means to advance the dogs.

6. In a device operable through rotary motion to effect sending of electric impulses in numbers corresponding to magnitude of angularity of the rotary motion, a normally engaged clutch controlling the rotary motion, a clutch disengaging member rotating with the clutch, means including a barrel rotatable with the engaged clutch and acting upon being interrupted to actuate said member to disengage the clutch, said barrel having perforations spaced angularly and longitudinally with respect to its axis in groups respresenting the orders of a number to be sent by impulses, groups of dogs corresponding to said groups of perforations for representing the digits in each order, said dogs being selectively advanceable to engage the barrel for entrance into said perforations to effect disengagement of the clutch and means to advance the dogs.

7. A clutch control mechanism for use with a device for sending impulses in numbers corresponding to magnitude of angularity of rotary motion which comprises a normally engaged rotating clutch, a clutch disengaging member rotating therewith, a barrel rotatable with the clutch and adapted to actuate said disengaging member to disengage the clutch upon rotation of said barrel being interrupted, said barrel having groups of angularly and longitudinally spaced perforations representing orders and digits of a number to be transmitted by impulses, groups of dogs corresponding to said groups of perforations and selectively advanceable to engage the barrel and enter the perforations, means to advance selected dogs, a second rotatable barrel inclosing the first and having angularly and longitudinally spaced perforations one corresponding to each group of dogs, and means for rotating the second barrel step by step to progessively admit dogs from successive order groups into controlling engagement with the first barrel.

8. A clutch control mechanism for use with a device for sending impulses in numbers corresponding to magnitude of angularity of rotary motion which comprises a normally engaged rotating clutch, a clutch disengaging member rotating therewith, a barrel rotatable with the clutch and adapted to actuate said disengaging member to disengage the clutch upon rotation of said barrel being interrupted, said barrel having groups of angularly and longitudinally spaced perforations representing orders and digits of a number to be transmitted by impulses, groups of dogs corresponding to said groups of perforations and selectively advanceable to engage the barrel and enter the perforations, means to advance selected dogs, a second rotatable barrel inclosing the first and having angularly and longitudinally spaced perforations one corresponding to each group of dogs, means for rotating the second barrel step by step to progressively admit dogs from successive order groups into controlling engagement with the first barrel, a second clutch controlling rotation of the second barrel, and means for effecting alternate engagement and disengagement of the clutches.

9. A clutch control mechanism for use with a device for sending impulses in numbers corresponding to magnitude of angularity of rotary motion which comprises a normally engaged rotating clutch, a clutch disengaging member rotating therewith, a barrel rotatable with the clutch and adapted to disengage the clutch upon rotation of said barrel being interrupted, said barrel having groups of angularly and longitudinally spaced perforations representing orders and digits of a number to be transmitted by impulses, groups of dogs corresponding to said groups of perforations and selectively advanceable to engage the barrel and enter the perforations, means to advance selected dogs, a second rotatable barrel inclosing the first and having angularly and longitudinally spaced perforations one corresponding to each group of dogs, means for rotating the second barrel step by step to progressively admit dogs from successive order groups into controlling engagement with the first barrel, a second clutch controlling rotation of the second barrel, and means for effecting alternate engagement and disengagement of the clutches, said means including sensing mechanism dependent upon the presence of a dog advanced through one of the perforations in the second barrel to continue said alternate operation.

10. In a device for mechanically selecting a multi-digit number represented by impulses, groups of advanceable selector dogs in which each group represents an order of the number to be selected and each dog represents a digit in an order, means to advance the dogs, a member with coded perforations for permitting advancement of a single dog in each order group, driven means to send impulses, a rotary member intercepted by the advanced dogs to limit the number of impulses sent, a second rotary member advanceable in steps inclosing the first rotary member and perforated to permit advancement of dogs from one group at a time to the first rotary member, and means to effect alternate rotation of said rotary members.

11. In a device for mechanically selecting a multi-digit number represented by impulses, groups of advanceable selector dogs in which each group represents an order of the number to be selected and each dog represents a digit in an order, means to advance the dogs, a member with coded perforations for permitting advancement of a single dog in each order group, driven means to send impulses, a rotary member controlling said driven means and intercepted by the advanced dogs to limit the number of impulses sent, a second rotary member advanceable in steps inclosing the first rotary member and perforated to permit advancement of dogs from one group at a time to the first rotary member, means to effect alternate rotation of said rotary members, and means effective upon the absence of a dog to be advanced through one of the perforations in the second rotary member to discontinue said rotation.

12. In a device for mechanically selecting a multi-digit number represented by impulses, groups of advanceable selector dogs in which each group represents an order of the number to be selected and each dog represents a digit in an order, means to advance the dogs, a member with coded perforations for permitting advancement of a single dog in each order group, driven means to send impulses, a rotary member controlling said driven means and intercepted by the advanced dogs to limit the number of impulses sent, a second rotary member advanceable in steps inclosing the first rotary member and perforated to permit advancement of dogs from one group at a time to the first rotary member, means to effect alternate rotation of said rotary members, and means effective upon the absence of a dog to be advanced through one of the perforations in the second rotary member to discontinue said rotation, to return the rotary members to normal positions, and to bring said driven means to rest.

13. In a device for controlling impulse sending mechanism which includes groups of advanceable selector dogs and a member with a perforate code to permit selected dogs to advance, resilient means to advance each dog including a spring and a lever between the spring and the dog, said lever having a pivot and a point of bearing with the spring that varies relative to the pivot in a manner to increase leverage on the dog as the tension of the spring decreases.

14. In a device for sending impulses representing members, a plurality of advanceable dogs arranged in groups of ten with each group representing an order of a number to be sent, means to advance the dogs, means to retain the dogs against advancing movement, and means for releasing them one group at a time.

15. In a device for sending impulses representing numbers, a plurality of advanceable dogs arranged in groups of ten with each group representing an order of a number to be sent, means to advance the dogs, means to retain the dogs against advancing movement, means for releasing them one group at a time, and a single spring actuated member opposing operation of the releasing means for all of the groups.

16. In a telephone dialing device or the like having a plurality of advanceable dogs for controlling dialing motion, means to advance the dogs, a tape-like member having coded perforations therein for selectively controlling advancement of the dogs, other means for controlling advancement of the dogs, and a series of large perforations in the tape to permit advancing of all the dogs while the other controlling means are functioning.

17. In a device to produce controlled intermittent rotary motion, a source of rotary motion, a normally engaged rotating clutch controlling said motion, a clutch disengaging member rotating with the clutch, means including a barrel rotatable with the engaged clutch and adapted to actuate said disengaging member to disengage the clutch upon rotation of said barrel being interrupted, said barrel having perforations spaced angularly and longitudinally with relation to its axis, a plurality of dogs selectively advanceable to engage the barrel for entrance into said perforations to effect disengagement of the clutch and means to advance the selected dogs.

References Cited in the file of this patent

UNITED STATES PATENTS

| | | |
|---|---|---|
| 1,882,106 | Wise | Oct. 11, 1932 |
| 2,051,845 | Grubb | Aug. 25, 1936 |
| 2,318,467 | Demeilenaeret et al. | May 4, 1943 |
| 2,416,713 | Parkinson | Mar. 4, 1947 |